US012794913B2

(12) United States Patent

Yadav et al.

(10) Patent No.: US 12,794,913 B2

(45) Date of Patent: Nov. 10, 2026

(54) METHODS AND SYSTEMS FOR DETECTING RECONNAISSANCE AND INFILTRATION IN DATA LAKES AND CLOUD WAREHOUSES

(71) Applicant: Theom, Inc., San Jose, CA (US)

(72) Inventors: Navindra Yadav, Cupertino, CA (US); Supreeth Hosur Nagesh Rao, Cupertino, CA (US); Ravi Kanth Sankuratri, Cupertino, CA (US); Danesh S. Irani, San Carlos, CA (US); Alok Lalit Wadhwa, Milipitas, CA (US); Vasil Dochkov Yordanov, San Jose, CA (US); Venkateshu Cherukupalli, West Windsor, NJ (US); Yiwei Wang, San Jose, CA (US); Zhiwen Zhang, San Jose, CA (US); Udayan Pramod Joshi, Cupertino, CA (US)

(73) Assignee: Theom, Inc., San Jose, CA (US)

( * ) Notice: Subject to any disclaimer, the term of this patent is extended or adjusted under 35 U.S.C. 154(b) by 140 days.

(21) Appl. No.: 18/214,527

(22) Filed: Jun. 27, 2023

(65) Prior Publication Data

US 2024/0106847 A1 Mar. 28, 2024

Related U.S. Application Data

(63) Continuation-in-part of application No. 17/335,932, filed on Jun. 1, 2021, now Pat. No. 12,010,124.

(60) Provisional application No. 63/439,579, filed on Jan. 18, 2023, provisional application No. 63/153,362, filed on Feb. 24, 2021.

(51) Int. Cl.
*H04L 9/40* (2022.01)

(52) U.S. Cl.
CPC ...... *H04L 63/1425* (2013.01); *H04L 63/1416* (2013.01); *H04L 63/1433* (2013.01); *H04L 63/145* (2013.01)

(58) Field of Classification Search
CPC ............. H04L 63/1425; H04L 63/1416; H04L 63/1433; H04L 63/145
See application file for complete search history.

(56) References Cited

U.S. PATENT DOCUMENTS

2018/0212990 A1* 7/2018 Kapadia ............. H04L 63/1425

* cited by examiner

*Primary Examiner* — Beemnet W Dada

(57) ABSTRACT

In one aspect, a computerized method for detecting reconnaissance and infiltration in data lakes and cloud warehouses, comprising: monitoring a SaaS data store or a cloud-native data store from inside the data store; examining the attack and automatically identifies how far the attack has progressed in the attack lifecycle; identifying the target and scope of the attack evaluates how far the attackers have penetrated the system and what is their target; and establishing the value of the asset subject to the attackers' attack and maps the impact of the attack on the CIA (confidentiality, integrity and availability) triad.

15 Claims, 37 Drawing Sheets

400

500

600

800

900

1000

1100

1200

1400

1500

1600

1700

1800

2000

2200

| Failure Reason | Failure Count | First Authentication Factor |
|---|---|---|
| OVERFLOW_FAILURE_EVENTS_ELIDED | 23 | null |
| INCOMING_IP_BLOCKED | 40 | Password |
| INCORRECT_USERNAME_PASSWORD | 67 | Password |
| USER_LOCKED_TEMP | 124 | Password |
| SAMLE_RESPONSE_INVALID | 13 | SAML2_ASSERTION |

2400

FIGURE 24

| client | errMsg | cnt | ip |
|---|---|---|---|
| JDBC_DRIVER | INCOMING_IP_BLOCKED | 1 | 10.25.0.4 |
| JDBC_DRIVER | INCOMING_IP_BLOCKED | 18 | 52.191.232.36 |
| JDBC_DRIVER | INCORRECT_USERNAME_PASSWORD | 1 | 10.0.60.4 |
| ODBC_DRIVER | INCORRECT_USERNAME_PASSWORD | 2 | 192.168.140.4 |
| ODBC_DRIVER | INCORRECT_USERNAME_PASSWORD | 10 | 40.88.200.75 |
| OTHER | INCORRECT_USERNAME_PASSWORD | 2 | 34.217.200.121 |
| OTHER | INCORRECT_USERNAME_PASSWORD | 1 | 54.205.175.56 |
| OTHER | OVERFLOW_FAILURE_EVENTS_ELIDED | 23 | 0.0.0.0 |
| PYTHON_DRIVER | INCOMING_IP_BLOCKED | 16 | 192.168.141.4 |
| PYTHON_DRIVER | INCORRECT_USERNAME_PASSWORD | 15 | 172.17.64.67 |
| PYTHON_DRIVER | INCORRECT_USERNAME_PASSWORD | 15 | 172.18.64.36 |
| PYTHON_DRIVER | USER_LOCKED_TEMP | 58 | 172.17.64.67 |
| PYTHON_DRIVER | USER_LOCKED_TEMP | 66 | 172.18.64.36 |
| SNOWFLAKE_UI | INCOMING_IP_BLOCKED | 2 | 192.168.129.5 |
| SNOWFLAKE_UI | INCOMING_IP_BLOCKED | 3 | 192.168.20.25 |
| SNOWFLAKE_UI | INCORRECT_USERNAME_PASSWORD | 4 | 192.168.128.4 |
| SNOWFLAKE_UI | INCORRECT_USERNAME_PASSWORD | 6 | 192.168.129.4 |
| SNOWFLAKE_UI | INCORRECT_USERNAME_PASSWORD | 1 | 192.168.129.5 |
| SNOWFLAKE_UI | INCORRECT_USERNAME_PASSWORD | 2 | 192.168.20.16 |
| SNOWFLAKE_UI | INCORRECT_USERNAME_PASSWORD | 8 | 192.168.20.25 |
| SNOWFLAKE_UI | SAML_RESPONSE_INVALID | 2 | 10.10.13.11 |
| SNOWFLAKE_UI | SAML_RESPONSE_INVALID | 1 | 10.10.13.13 |
| SNOWFLAKE_UI | SAML_RESPONSE_INVALID | 4 | 192.168.129.5 |
| SNOWFLAKE_UI | SAML_RESPONSE_INVALID | 4 | 192.168.140.4 |
| SNOWFLAKE_UI | SAML_RESPONSE_INVALID | 2 | 192.168.20.25 |

2500

FIGURE 25

METHODS AND SYSTEMS FOR DETECTING RECONNAISSANCE AND INFILTRATION IN DATA LAKES AND CLOUD WAREHOUSES

CLAIM OF PRIORITY

This application claims priority to U.S. Provisional Application No. 63/439,579, filed on 18 Jan. 2023 and titled DATA STORE ANALYSIS METHODS AND SYSTEMS. This provisional application is hereby incorporated by reference in its entirety.

This application claims priority to the U.S. patent application Ser. No. 17/335,932, filed on Jun. 1, 2021 and titled METHODS AND SYSTEMS FOR PREVENTION OF VENDOR DATA ABUSE. The U.S. patent application Ser. No. 17/335,932 is hereby incorporated by reference in its entirety.

U.S. patent application Ser. No. 17/335,932 application claims priority to U.S. Provisional Patent Application No. 63/153,362, filed on 24 Feb. 2021 and titled DATA PRIVACY AND ZERO TRUST SECURITY CENTERED AROUND DATA AND ACCESS, ALONG WITH AUTOMATED POLICY GENERATION AND RISK ASSESSMENTS. This utility patent application is incorporated herein by reference in its entirety.

FIELD OF INVENTION

This application is related to cloud-platform security and, more specifically, detecting reconnaissance and infiltration in data lakes and cloud warehouses.

BACKGROUND

Cyber-attacks on enterprise data can happen at any time. Data is the most critical asset of any enterprise. Almost all cybersecurity tools and techniques invented and deployed to date focus on protecting the data by proxy. They either focus on protecting the server/application or the endpoints (e.g. desktop, laptop, mobile, etc.) and by proxy, assume the data is protected. The paradox in the cybersecurity industry is, data breaches are growing and measured by any metric with every passing day, despite more money and resources being deployed into cybersecurity solutions, so clearly existing approaches are failing, begging for a new solution.

SUMMARY OF THE INVENTION

In one aspect, a computerized method for detecting reconnaissance and infiltration in data lakes and cloud warehouses, comprising: monitoring a SaaS data store or a cloud-native data store from inside the data store; examining the attack and automatically identifies how far the attack has progressed in the attack lifecycle; identifying the target and scope of the attack evaluates how far the attackers have penetrated the system and what is their target; and establishing the value of the asset subject to the attackers' attack and maps the impact of the attack on the CIA (confidentiality, integrity and availability) triad.

In another aspect, a computerized method for implementing a SaaS data store and data lake house cybersecurity hygiene posture analysis: automatically analyzing and checking an entity's SaaS data lakes and warehouses for a set of cybersecurity weaknesses that are exploitable by an attacker; based on the analyzing and checking, determining a set of cybersecurity weakness in the entity's SaaS data lakes and warehouse; ranking the cybersecurity weaknesses based on a data at risk value, wherein to determine the data at risk value; classifying a content of the data in the entity's SaaS data lakes and warehouses; calculating a preventative cybersecurity grade for the entity's SaaS data lakes and warehouses; automatically detecting any data stores in the entity's SaaS data lakes and warehouses that have data stored that have been copied from another primary data repository and have a different security posture; automatically detecting any data stores in the entity's SaaS data lakes and warehouses that have data stored that have not been accessed in a specified period; and tracking and classify a cyberattack and places the cyberattack in one of n-number stages.

BRIEF DESCRIPTION OF THE DRAWINGS

FIGS. 24-25 illustrate example tables used for reconnaissance attack detection, according to some embodiments.

Figure 1:
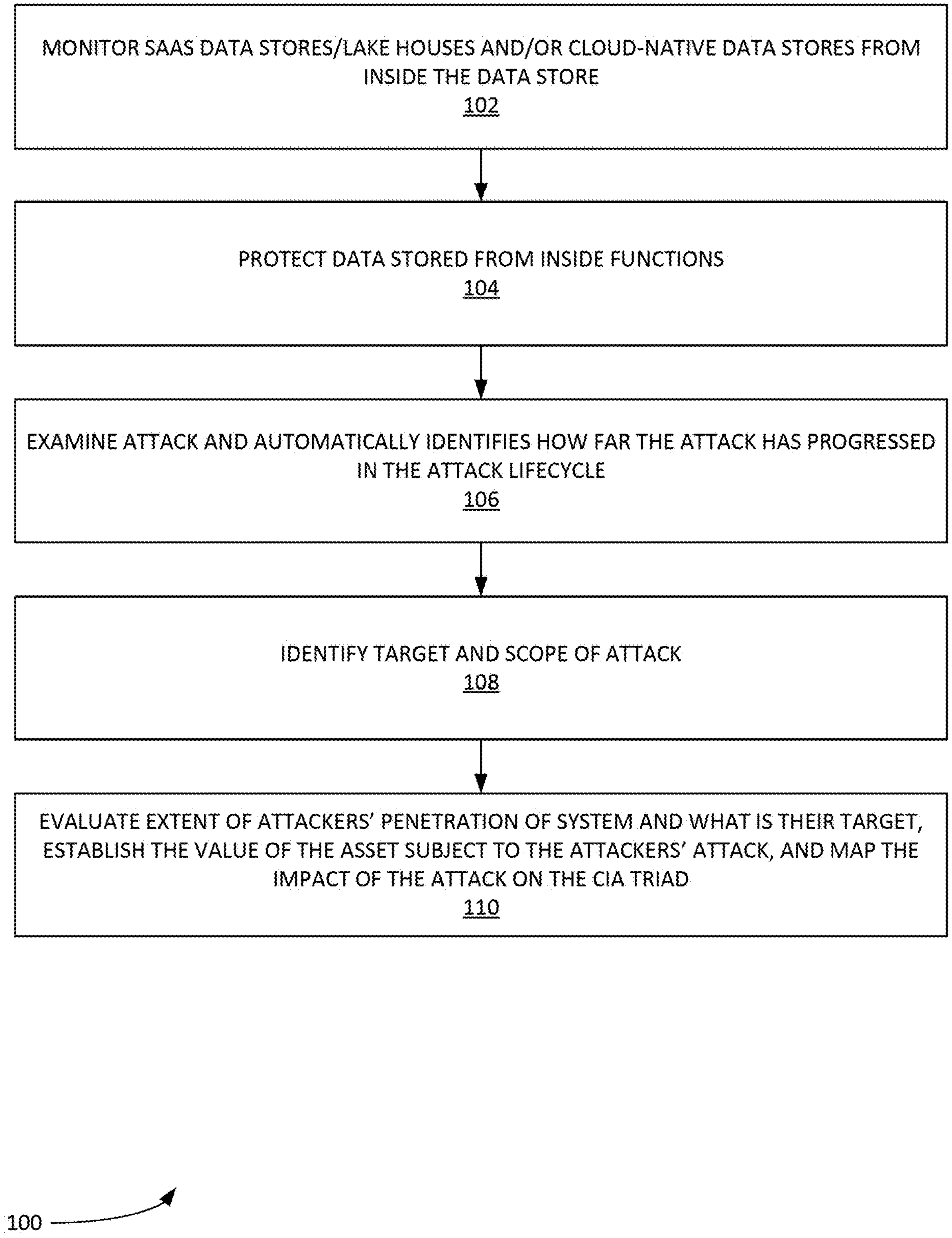
FIG. 1 illustrates an example process for detecting reconnaissance and infiltration in data lakes and cloud warehouses, according to some embodiments.

The Figures described above are a representative set and are not exhaustive with respect to embodying the invention.

DESCRIPTION

Disclosed are a system, method, and article for detecting reconnaissance and infiltration in data lakes and cloud warehouses. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to 'one embodiment,' 'an embodiment,' 'one example,' or similar language means that a particular feature, structure, or characteristic described in connection with the embodiment is included in at least one embodiment of the present invention. Thus, appearances of the phrases 'in one embodiment,' 'in an embodiment,' and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. However, one skilled in the relevant art can recognize that the invention may be practiced without one or more of the specific details or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Definitions

Example definitions for some embodiments are now provided.

Application programming interface (API) can be a computing interface that defines interactions between multiple software intermediaries. An API can define the types of calls and/or requests that can be made, how to make them, the data formats that should be used, the conventions to follow, etc. An API can also provide extension mechanisms so that users can extend existing functionality in various ways and to varying degrees.

CIA triad (confidentiality, integrity and availability) of information security.

Cloud computing is the on-demand availability of computer system resources, especially data storage (e.g. cloud storage) and computing power, without direct active management by the user.

Cloud database is a database that typically runs on a cloud computing platform and access to the database is provided as-a-service.

Cloud storage is a model of computer data storage in which the digital data is stored in logical pools, said to be on "the cloud". The physical storage spans multiple servers (e.g. in multiple locations), and the physical environment is typically owned and managed by a hosting company. These cloud storage providers can keep the data available and accessible, and the physical environment secured, protected, and running.

Cloud data warehouse is a cloud-based data warehouse. Cloud data warehouse can be used for storing and managing large amounts of data in a public cloud. Cloud data warehouse can enable quick access and use of an entity's data.

Dark web is the World Wide Web content that exists on darknets: overlay networks that use the Internet but require specific software, configurations, or authorization to access. Through the dark web, private computer networks can communicate and conduct business anonymously without divulging identifying information, such as a user's location.

DBaaS (Database as a Service) can be a cloud computing service that provides access to and use a cloud database system.

Data lake is a system or repository of data stored in its natural/raw format. A data lake can be object blobs or files. A data lake is usually a single store of data including raw copies of source system data, sensor data, social data etc. A data lake can include various transformed data used for tasks such as reporting, visualization, advanced analytics, and machine learning. A data lake can include structured data from relational databases (rows and columns), semi-structured data (e.g. CSV, logs, XML, JSON), unstructured data (e.g. emails, documents, PDFs) and binary data (e.g. images, audio, video). A data lake can be established "on premises" (e.g. within an organization's data centers) or "in the cloud" (e.g. using cloud services from various vendors).

Malware is any software intentionally designed to disrupt a computer, server, client, or computer network, leak private information, gain unauthorized access to information or systems, deprive access to information, or which unknowingly interferes with the user's computer security and privacy. Researchers tend to classify malware into one or more sub-types (e.g. computer viruses, worms, Trojan horses, ransomware, spyware, adware, rogue software, wiper and keyloggers).

Privilege escalation can be the act of exploiting a bug, a design flaw, or a configuration oversight in an operating system or software application to gain elevated access to resources that are normally protected from an application or user. The result can be that an application with more privileges than intended by the application developer or system administrator can perform unauthorized actions.

Tactics, techniques, and procedures (TTPs) are the "patterns of activities or methods associated with a specific threat actor or group of threat actors.

EXAMPLE METHODS

FIG. 1 illustrates an example process 100 for detecting reconnaissance and infiltration in data lakes and cloud warehouses, according to some embodiments. In step 102, process 100 monitors the SaaS data stores/lake houses (e.g. Snowflake®, DataBricks®, AWS RedShift®, Azure Synapse®, and GCP BigQuery®) and/or cloud-native data stores from inside the data store. Process 100 leverages tools like machine learning to detect an attacker (e.g. human or malware) attempting to abuse data and drives an automated protection action.

In step 104, process 100 protects the data stored from inside functions like human antibodies detecting infection and protecting the human body. Antibodies do a better job of protecting the body from viruses or foreign objects than externally administered drugs. This was brought to the general public's consciousness during the Covid pandemic. People with well-tailored or well-boosted immune systems handled the covid virus better. Similarly, an intrusion detection and protection system embedded into the data store and is well dispersed in the data stores watches every interaction with the data and identifies what's normal for what type of role and user with what type of data. The moment the malware or malicious human tries to access or manipulate data or the structure of the data or policies/governance constructs surrounding the data, the system in real-time swings into action with a very tailored plus measured response to neutralize the damage.

In step 106, process 100 examines the attack and automatically identifies how far the attack has progressed in the attack lifecycle (e.g. attack kill chain). This is important as it gives a sense of response time available to the humans protecting the system when operating cyberattack defenses in a manual or hybrid mode. It can provide information about how long the enterprise have left before the damage from the attackers is permanent.

In step 108, process 100 identifies the target and scope of the attack. This further enables the human operators to prioritize the attack response because process 100 assesses the impact of the attack and the ramifications of the attack. Process 100 auto-classifies the data inside the data stores and establishes the financial value of the data by using pricing signals from the data bounties in the dark web. It establishes the minimum dollar value of the data. Further, by examining the sequence of attack steps/commands being executed, process 100 establishes the target of the attack, the scope, and how the data may be compromised (e.g. confidentiality (e.g. data leak) and/or integrity (e.g. data maliciously be manipulated) and/or availability (e.g. ransomware) of the data being compromised)).

In step 110, process 100 evaluates how far the attackers have penetrated the system and what is their target, establishes the value of the asset subject to the attackers' attack, and maps the impact of the attack on the CIA triad. This enables security practitioners to look at the attack as it builds out and take the remediation action with full view.

Figure 2:
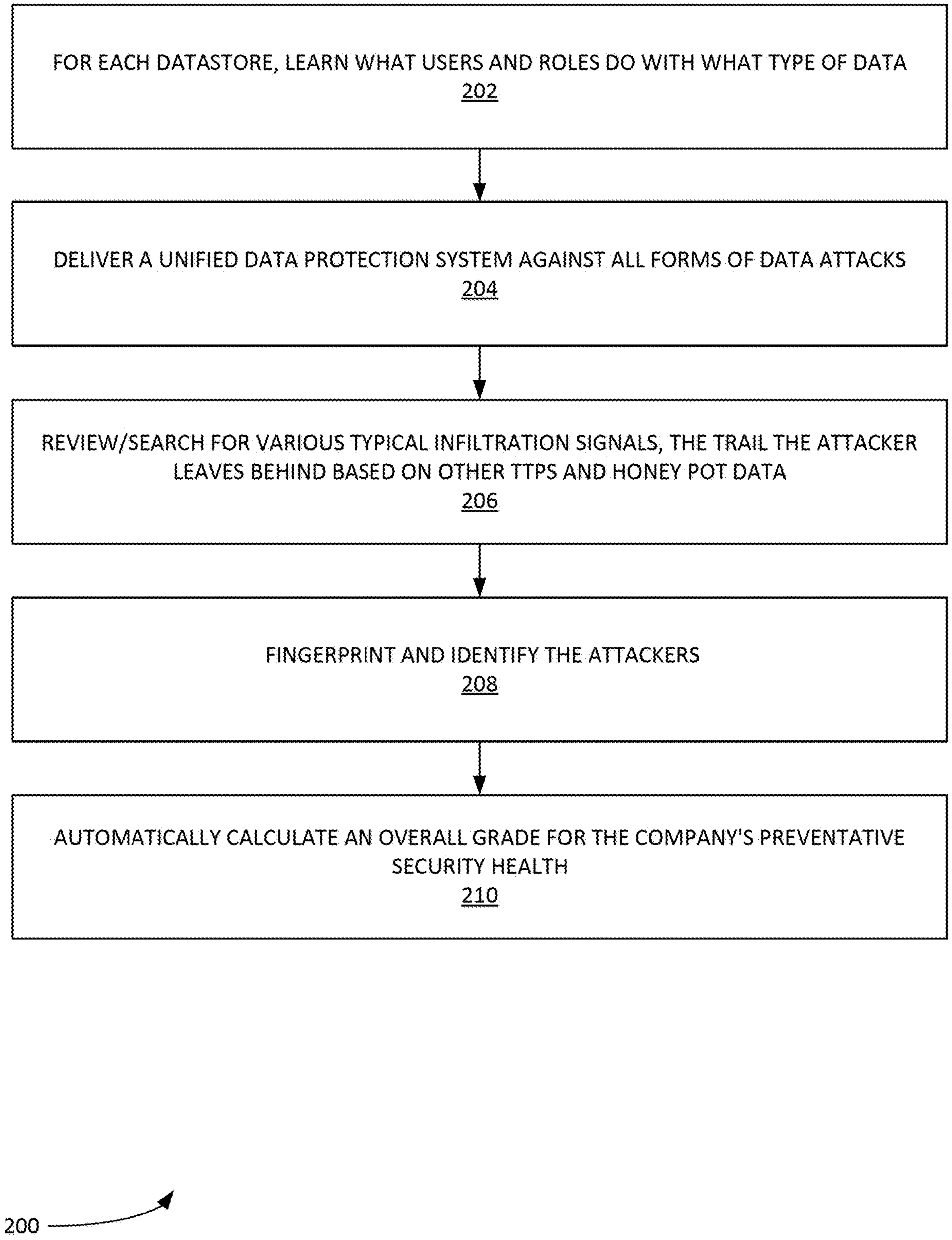
FIG. 2 illustrates an example cybersecurity process, according to some embodiments.

FIG. 2 illustrates an example cybersecurity process 200, according to some embodiments. It is noted that reconnaissance refers to the process where the attacker or the insider with malicious intent is working to ascertain how to get a foothold into the data lake or warehouse. Process 200 focuses on protecting the data directly and not by proxy. This means it extends its protection on the entire data set with no blind spots. Further, it can classify and establish the importance of the data for the business and prioritize which attack or risk the company should focus on. Process 200 operates inside the data store and sees all the interactions with data, from data structure or schema manipulation and data policy manipulation to data access and manipulation.

In step 202, process 200 learns from every data store in which it is. Process 200 learns what users and roles do with what type of data. Process 200 adapts to every environment it is placed in. It can identify failed logins and unusual associated activity by looking at the volume of such failed attempts with factors like the user's location and time of day. Failed logins from machines and users are both tracked. Failed login attempts done by processes that mimic a malware's execution/scenario attempts are also profiled and graded.

In step 204, process 200 delivers a unified data protection system against all forms of data attacks. Process 200 provides a solution that covers the entire spectrum from malicious or accidental insider attacks (e.g. phished user attacks), advanced persistent threats to automated supply chain attacks where malware exploits vulnerabilities in trusted code and gains access to trusted systems. The impact of how far the attack has progressed and the financial damage that can be caused is also quantified.

In step 206, process 200 reviews/searches for various typical infiltration signals, the trail the attacker leaves behind based on other TTPs and honey pot data. These include, inter alia: notification changes coupled with monitoring disablement or monitoring config changes; privilege escalation within the context of a data lake; etc. This can include additional privilege grants that process 200 tracks within the data lake.

If a user assumes a group with admin privileges and this type has been a read-only user, process 200 tracks such behavior. Any new groups that are created with higher admin privileges during diff times of the day or by a user who also did notification changes. Process 200 can create or alter objects inside the data lake, including security objects. Process 200 can alter and/or create attributes that impact security or access. These are when the user's behavior or role has not been part of such changes in the environment. Process 200 can change and/or alter security integrations. Process 200 can create new session policies and modify idle timeouts of existing sessions. Process 200 can manage anonymous UDF calls or API calls. In each of the above listed, the combination of the events adds to creating a stronger signal of reconnaissance and infiltration.

In step 208, process 200 can also fingerprint and identify the attackers. Process 200 uses the well-known technique of attacker classification by examining the Tactics, Technique, and Procedure (UP) of the attack sequence. The fingerprinting further helps identify reconnaissance and infiltration signals within the data lake.

In step 210, process 200 automatically calculates an overall grade for the company's preventative security health (e.g. security hygiene). The grade is calculated across all the company's data assets in the cloud and SaaS data stores. It informs the cybersecurity executive team how well the company is doing in keeping its security hygiene posture up. A good posture means fewer escalations and panic events. It also means companies can drive down their cyber insurance premiums. They also know what assets need more protection, focus, etc. Process 200 helps management get a bird's eye view of their investments and any alignment needed. Process 200 gives them an overall grade of how well they are doing versus their peers as well.

Figure 3:
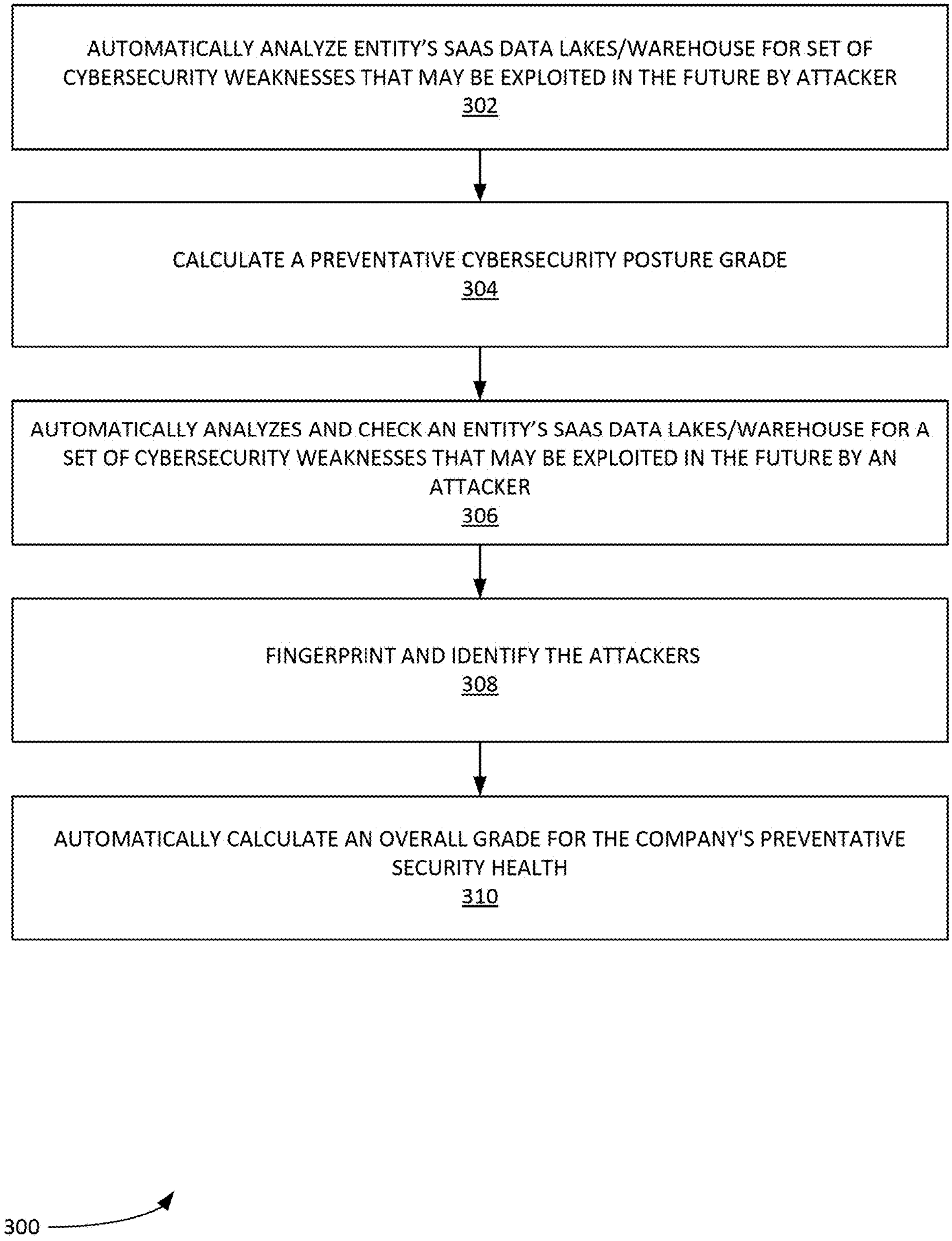
FIG. 3 illustrates an example process for SaaS data store and data lake house cybersecurity hygiene posture analysis, according to some embodiments.

FIG. 3 illustrates an example process 300 for SaaS data store and data lake house cybersecurity hygiene posture analysis, according to some embodiments. Process 300 can provide cybersecurity posture analysis.

In step 302, process 300 automatically analyzes and check an entity's SaaS data lakes/warehouse for a set of cybersecurity weaknesses that may be exploited in the future by an attacker. Process 300 ranks the weaknesses it finds based on the data at risk. To evaluate the data at risk, process 300 classifies the content of the data (supports both structured and unstructured data). Process 300 classification uses a set of natural language processing engines to work on the data and identify the set of entity types present in each unit (e.g. cells, columns, rows, files, objects, tables, database, etc.) of the data. Process 300 puts a dollar value on the data by cross-checking the $value bad actors are willing to pay for entity types, by looking at the dark web marketplace. Process 300 allows customers to find the pricing model for entity types they care about. Process 300 uses a combination of entity criticality, asset $ value, and ease of exploitability of the issue to automatically prioritize issues for the security teams to address.

Figure 4:
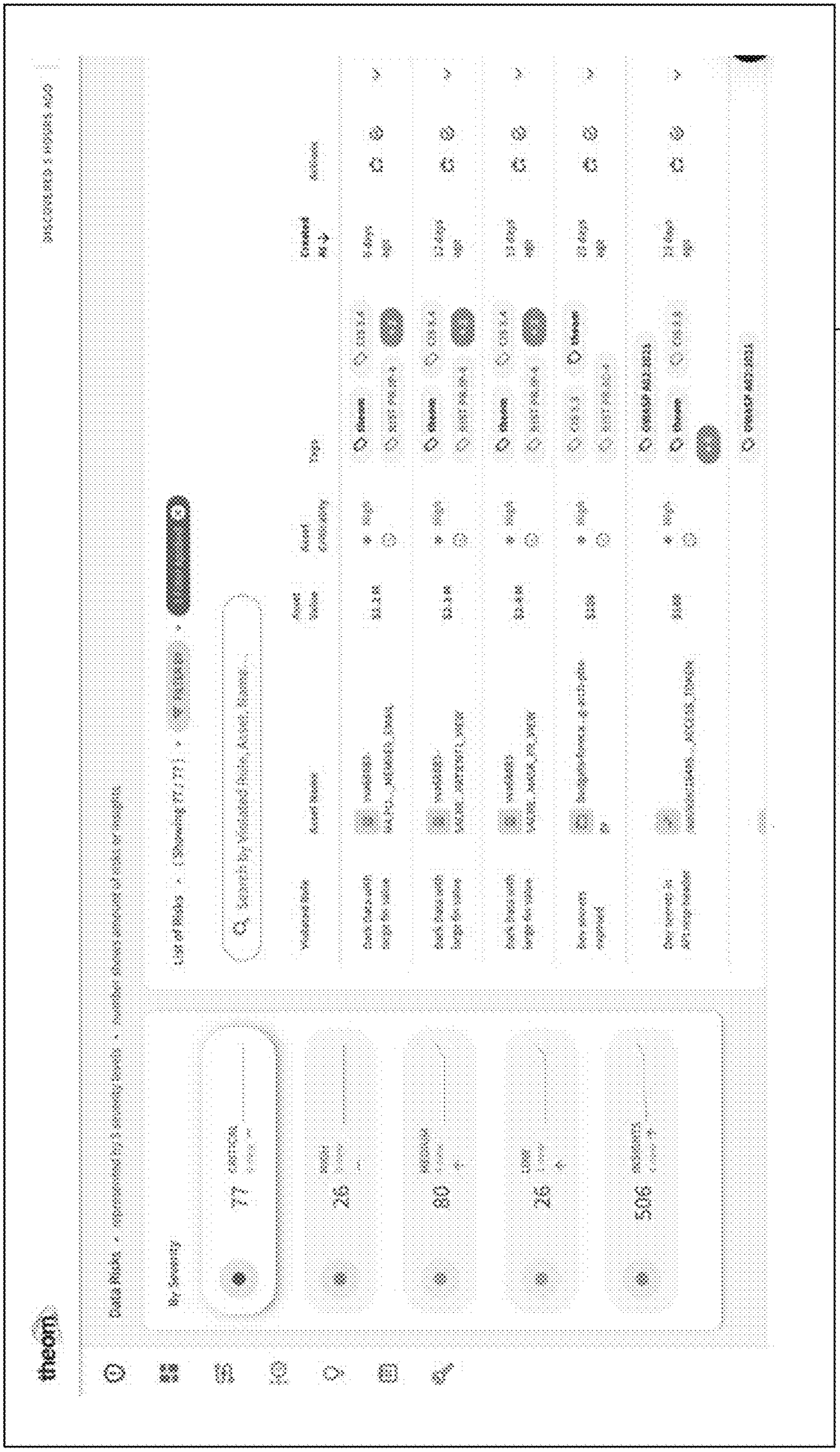
FIG. 4 illustrates a dashboard with real-time prioritized risk feed of the security issues is provided, according to some embodiments.

FIG. 4 illustrates a dashboard with real-time prioritized risk feed of the security issues is provided, according to some embodiments. As shown, real-time prioritized risk feed of the security issues can also sent over to various STEM/SOAR and ITSM/Alerting platforms to drive automation workflows the customer is used to.

The key novelty here is process 300 uses the content of the data, the context of the data, and the context of the identity accessing the data to find security issues, use the data content, and how easy it is for the attacker to exploit the risk to prioritize what's important, how important it is, and then get the users to prioritize their limited resources on the most important things to get the highest value for their investment. All this is automated, and no security system has built an end-to-end automated workflow starting from understanding the data of the enterprise and driving prioritized issue resolution, all done in real time, with no data leaving the customer's jurisdiction.

Further, process 300 calculates the overall preventative cybersecurity hygiene (e.g. posture) score in real-time. And keeps track of the score over time. Executives like CISOs (Chief Information Security Officers)/CIOs (Chief Information Officers) especially like this feature of process 300 as this gives them a good bird's eye view of their security posture. Additionally, process 300 can then answer this key question "How secure is my company's data? What is my company's security grade or report card?"

In step 304, process 300 can calculate a preventative cybersecurity (e.g. posture) grade. The following equation can be utilized by way of example:

$$x = 1 - \Big[\big\{100 * (CHRh/CH + CHRM/CH + CHRL/CH) + 10 * \{CMRh/CM + CMRM/CM + CMRL/CM) + (CLRH/CL + CLRM/CL + CLRL/CL)\big\} / 111\Big]$$

C is either Cardinality of Entities associated with a CategoryHigh|Medium|Low OR The Sum of the financial value based $ for the Entities in High|Medium|Low.

In one example, the default option can be cardinality.

The user can toggle a button on the user interface to get either the cardinality or the asset value.

The default grading formula based on Cardinality is:

$X$=[(Cardinality of High Entities with Severity 1 issues/Cardinality of all High Entities+Cardinality of High Entities with Severity 2 issues/Cardinality of all High Entities+Cardinality of High Entities with Severity 3 issues/Cardinality of all High Entities+Cardinality of High Entities with Severity 4/Cardinality of all High Entities)*100+(Cardinality of Medium Entities with Severity 1 issues/Cardinality of all Medium Entities+Cardinality of Medium Entities with Severity 2 issues/Cardinality of all Medium Entities+Cardinality of Medium Entities with Severity 3 issues/Cardinality of all Medium Entities+Cardinality of Medium Entities with Severity 4/Cardinality of all Medium Entities)*10+(Cardinality of Low Entities with Severity 1 issues/Cardinality of all Low Entities+Cardinality of Low Entities with Severity 2 issues/Cardinality of all Low Entities+Cardinality of Low Entities with Severity 3 issues/Cardinality of all Low Entities+Cardinality of Low Entities with Severity 4/Cardinality of all Low Entities)*1]/111

The default grading formula based on the $ value is similar to the cardinality formula. Replace cardinality with $ value for the entities.

Grade Assignment:

$$\text{Grade} = A+ \text{ if } 0.97 <= X <= 1$$

$$\text{Grade} = A+ \text{ if } 0.93 <= X <= .96$$

$$\text{Grade} = A- \text{ if } 0.9 <= X < = .92$$

$$\text{Grade} = B+ \text{ if } 0.87 <= X <= .89$$

$$\text{Grade} = B \text{ if } 0.83 <= X <= .86$$

$$\text{Grade} = B- \text{ if } 0.8 <= X <= .82$$

$$\text{Grade} = C+ \text{ if } 0.77 <= X <= .79$$

$$\text{Grade} = C \text{ if } 0.73 <= X <= 0.76$$

$$\text{Grade} = C- \text{ if } 0.70 <= X <= 0.72$$

$$\text{Grade} = D+ \text{ if } 0.67 <= X <= .69$$

$$\text{Grade} = D \text{ if } 0.65 <= X <= 0.66$$

$$\text{Grade} = D- \text{ if } 0.65 < X$$

These equations are provided by way of example and not of limitation. Examples of some of the built-in preventative cybersecurity insights process 300 (and/or the other systems and methods provided herein) delivers for its customers using a combination of machine learning and security analysis on the data and access identity for SaaS Data Stores. These are by no means exhaustive. Besides the built-in insight engines, process 300 (and/or the other systems and methods provided herein) enables the end customers' governance and data assurance teams to define their own custom insight engines.

Figure 5:
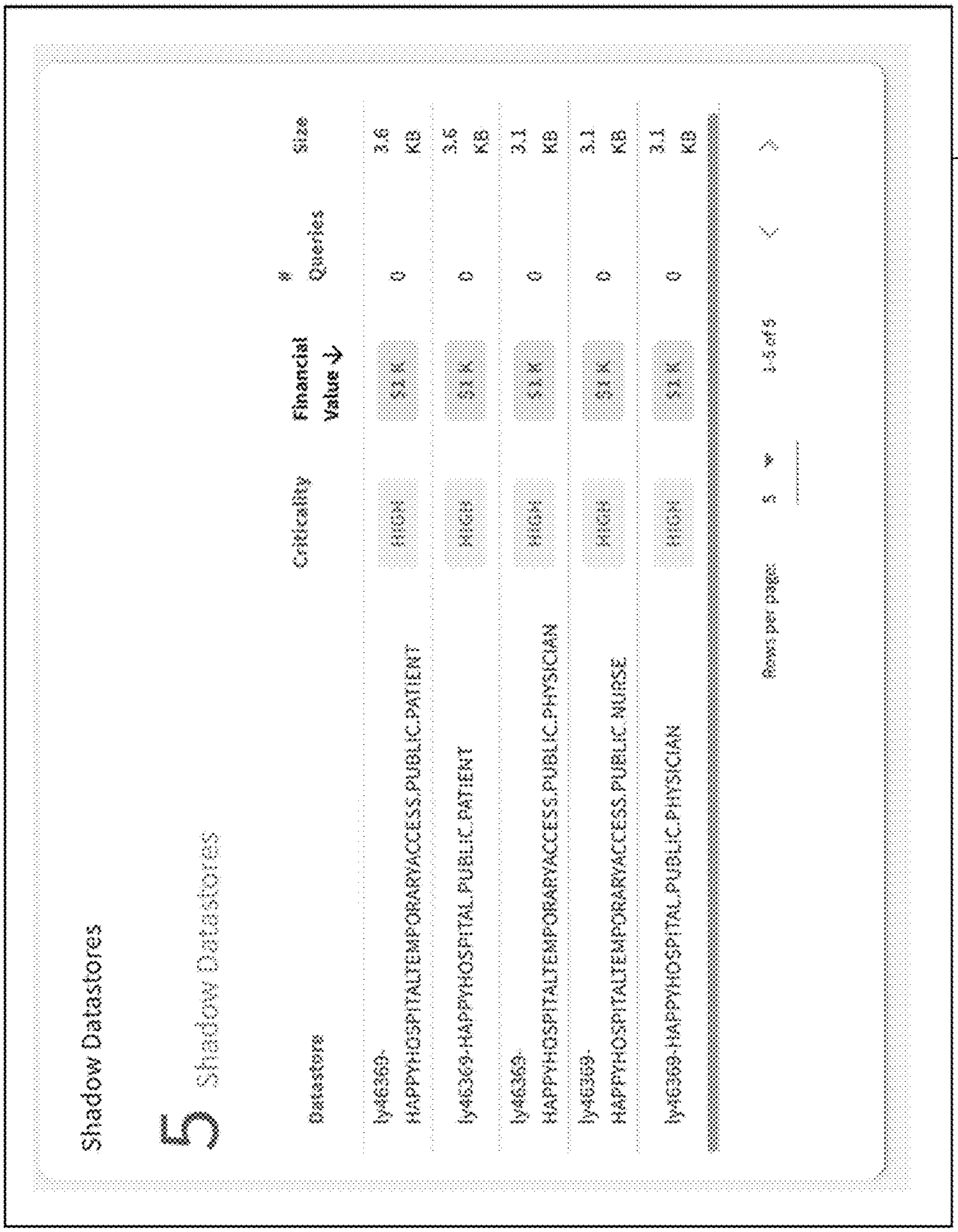
FIG. 5 illustrates an example screenshot showing shadow data analytics, according to some embodiments.

FIG. 5 illustrates an example screenshot 500 showing shadow data analytics, according to some embodiments. Process 300 can automatically detect data stores that have data stored in them that have been copied over from the primary data repositories and have a different security posture in step 306. Here, the security protection given to the different copies is different; this is almost always an indicator of a lurking security issue. Step 304 can additionally put a s business $value and criticality ranking to the shadow stores and inform the security team the identity of who inside the enterprise is accessing the shadow copies of the data so that they can follow up with the right parties, greatly reducing the burden of the security and data governance/assurance teams.

Figure 6:
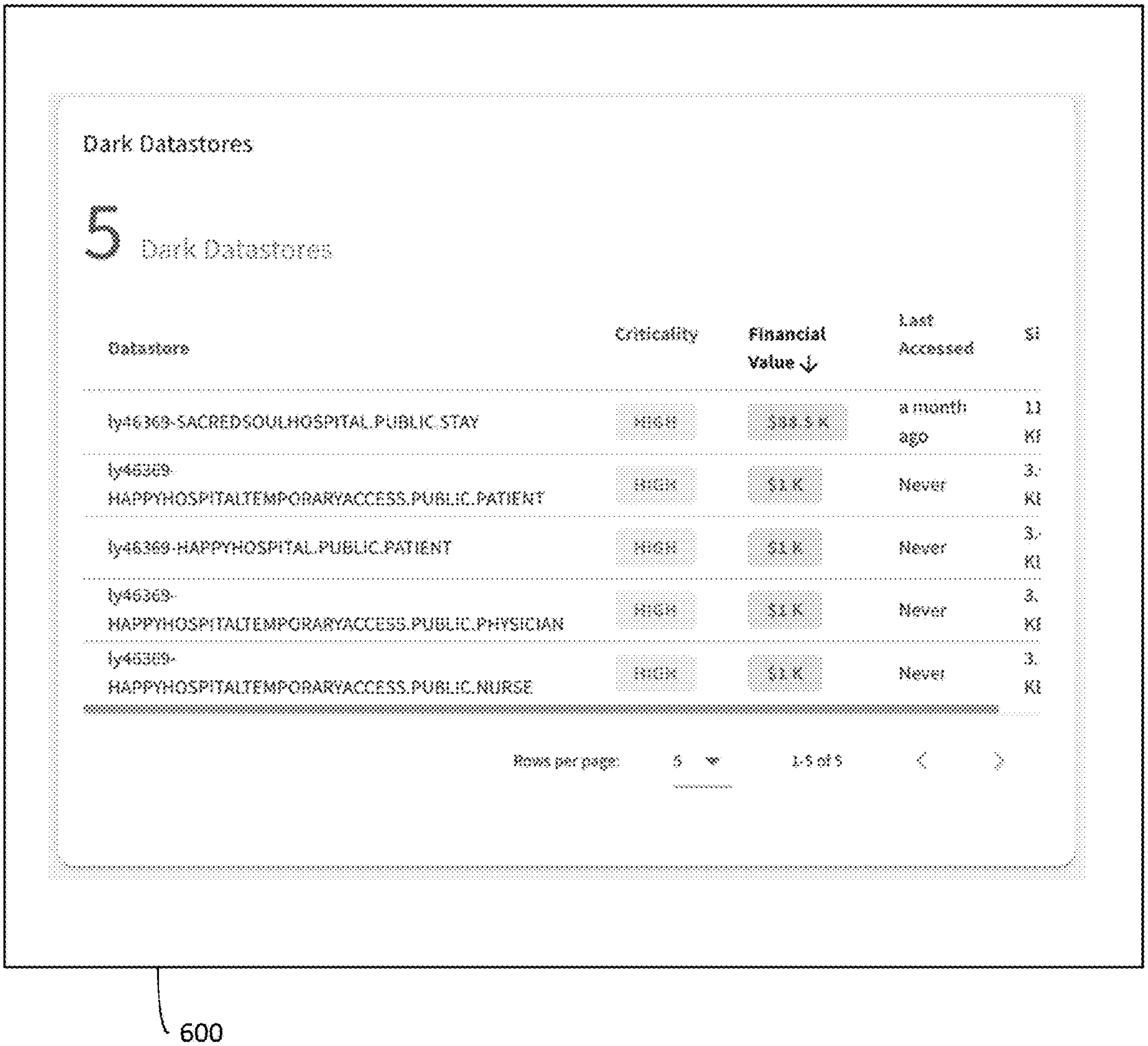
FIG. 6 illustrates an example screenshot showing dark data analytics, according to some embodiments.

FIG. 6 illustrates an example screenshot 600 showing dark data analytics, according to some embodiments. Process 300 can automatically detect data stores that have data stored in them that have not been accessed in a specified period in step 308. The duration of the specified period is configurable and can be of any value (e.g. from a month to n-number of years, etc.). If data is stored in some repository, which is not accessed for a certain period (e.g. seven years, n-number of years, etc.), process 300 then automatically establishes a dollar value and the criticality of the data. This enables the security, data assurance, and governance teams to perform a data minimization operation and free up data risks. The fewer items that need to be protected, the less the company/entity spends on security and/or more likely can focus its already limited resources on protecting things that matter for the company. Additionally, by freeing up data that is not needed, the company saves money in operations, and invoices it pays its vendors like cloud service providers (e.g. Amazon®, Google®, Microsoft®, etc.), and can use these savings for other business operations. Process 300 additionally determines and assigns a business $value. This can be used in providing a criticality ranking to the dark stores and informs the security/data assurance/governance teams of the risk of not deleting the data.

In step 310, process 300 implements data lake and warehouse intrusion detection.

As shown in the FIG. 6, process 300 tracks and classifies every attack and places it in one of the five stages of the attack kill chain, according to some embodiments. In step 312, process 300 tracks and classifies every attack and places it in one of the five stages (or n-number of stages) and classifies every attack and places it in one of the five stages of the attack kill chain. Each stage itself may have three or four sub-stages (and/or n-number)a. The attack stages can be based on the known attack kill chain from MITRE (i.e. the Mitre corporation). Process 300 can, while observing all accesses to the data from inside the data store (e.g. data lake, warehouse, database, cloud-native data store, etc.) automatically identifies and classifies the attack, how far the attack has reached, a magnitude of the impact of the attack, without compromising the performance of the data store and without missing single access to the data and without deployment friction (e.g. is agentless).

Figure 7:
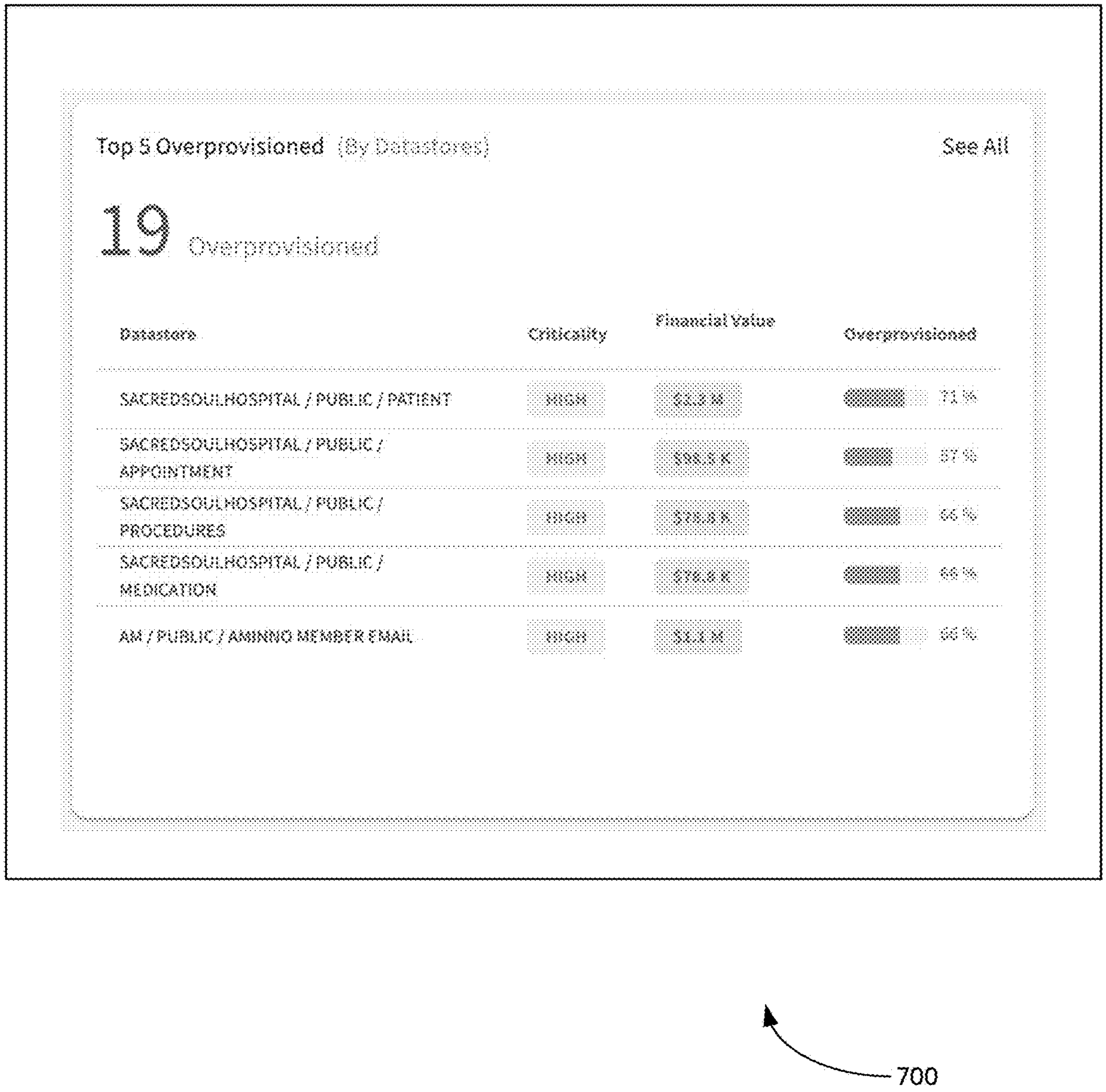
FIG. 7 illustrates screen shots of information about over-provisioned access, according to some embodiments.

FIG. 7 illustrates screen shots of information about over-provisioned access, according to some embodiments. In step 314, process 300 can apply automatic principle of least privilege/protection surface reduction methods. Process 300 analyzes the data stored inside data stores (e.g. data lakes, data warehouses, etc.) and establishes the importance and criticality of the data. Further, process 300 automatically analyzes the CONFIGURED access permissions to every table and database. Process 300 then studies which individuals/users, machines (e.g. service accounts, headless accounts), and access roles are used to access each piece of data. Process 300 studies both the past data access behavior (aka lookback period) and also the real-time access behavior. Process 300 supports a default lookback period (e.g. of 90 days, n-number days, etc.). In some examples, the user can select a lookback period of a year or more.

Using all this information, process 300 automatically computes how much over-provisioned an access role or access user is for the most granular unit of data. In the case of data lakes and data warehouses, the most granular unit of data is a data store table or a column inside a table inside a database. As shown in the figure above. The percentage shows how over-provisioned access to data is. In other words how many users or machines can access the data that have no business accessing that data? An over-provisioned percentage of 0% is ideal, which means only the people or machines which need access at any point in time have access, and no one else. This is the best security preventative security posture to run an organization with. But it's impossible to do with human-driven systems or the state of art present in the industry. Process 300 delivers this automatically for the entity undergoing analysis (e.g. a customer, etc.).

To get to the overprovisioned percentage, Process 300 looks at two identity access constructs. The role and the user/machine identity. Process 300 evaluates how to optimally determine every role to every table/column inside the database/data lake/warehouse configured. It analyzes all the privileges granted to the role of the particular table and column. Next, process 300 studies the user-to-role or user-to-attribute relationship. Studies which roles and attributes are superfluous and automate the pruning of those extra grants, to give the customer the best possible security access posture for their data at any point in time.

Figure 8:
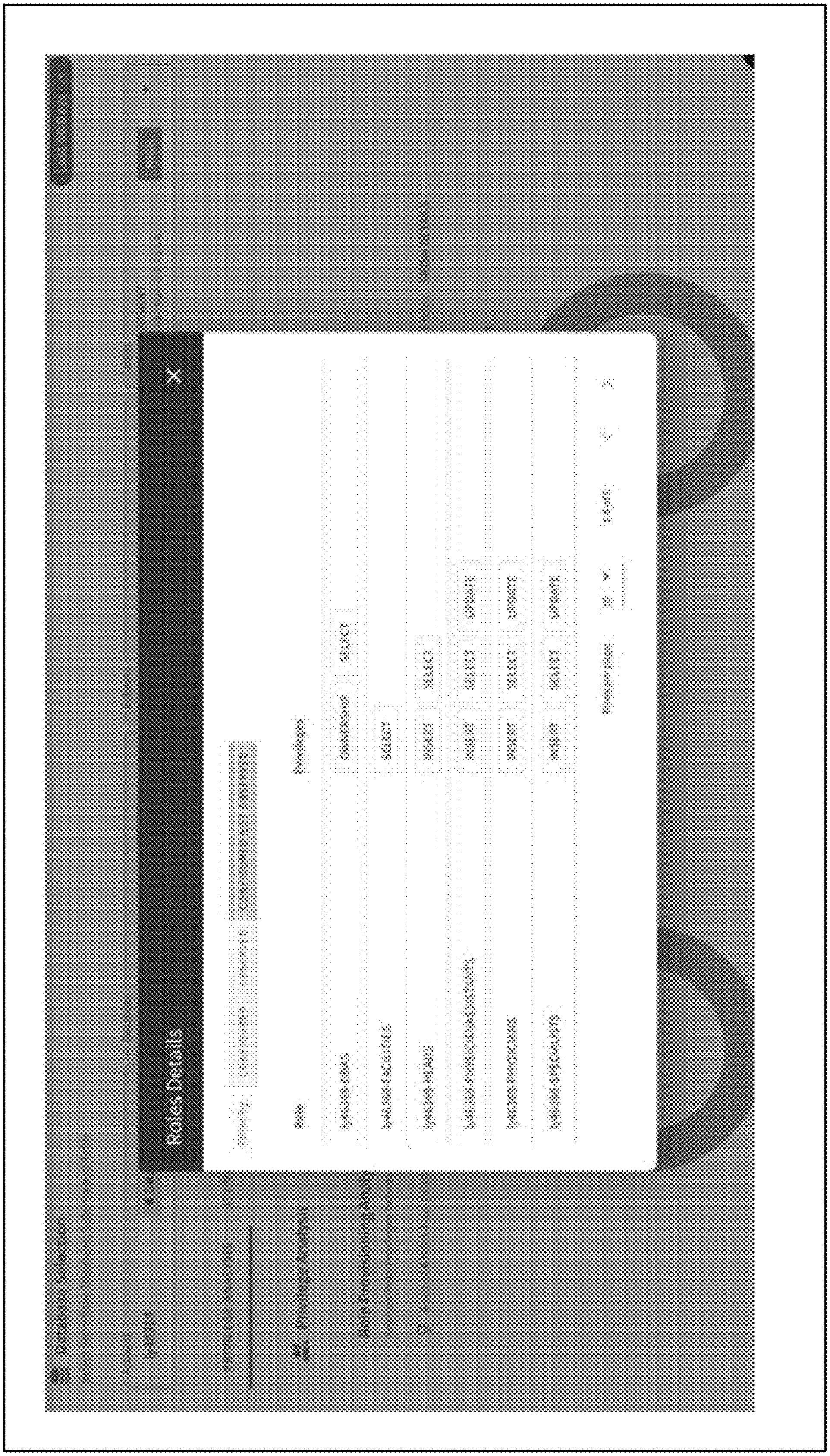
FIG. 8 illustrates an example screenshot showing identify over-provisioned roles, according to some embodiments.

FIG. 8 illustrates an example screenshot 800 showing identify over-provisioned roles, according to some embodiments. In step 316, process 300 can identify over-provisioned roles. To identify over-provisioned roles, process 300 reviews and analyzes all the privileges granted to every role. Process 300 looks at the past data access behavior as well as the real-time data access patterns in the table or columns inside the data lake/warehouse and determines what are collections of privileges actually used over the rolling lookback period. Process 300 compares this to the configured privileges for the specific table or column in question. Process 300 automatically deduces the privileges the role does NOT use and hence does not need. This enables process 300 to drive an automated workflow to "shrinkwrap" the privileges associated with the table/columns of data.

Figure 9:
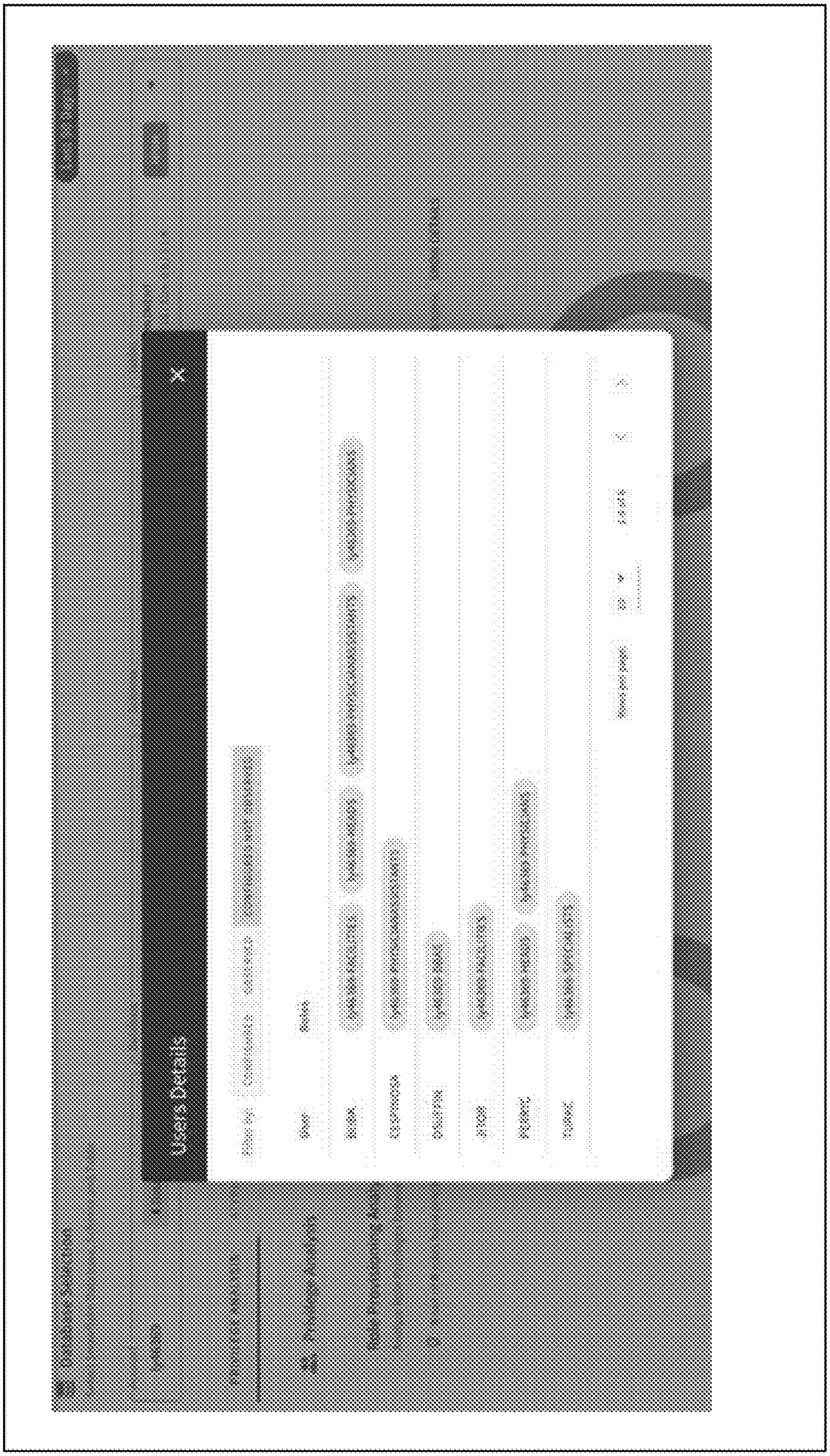
FIG. 9 illustrates an example screenshot showing identify over-provisioned users and machine, according to some embodiments.

FIG. 9 illustrates an example screenshot 900 showing identify over-provisioned users and machine, according to some embodiments. In step 318, process 300 can identify over-provisioned users and machines, as shown in the figure above. Process 300 examines all the roles granted to every user who has access to the table and columns. Process 300 examines at the past data access behavior as well as the real-time data access patterns into the table or columns inside the data lake/warehouse and determines what are the collection of roles actually used over the rolling lookback period by the user or machine to access the data. Process 300 compares this to the configured roles for the specific table or column in question. Process 300 automatically deduces the roles the user or machine does NOT use and hence does not need. This enables process 300 to drive an automated workflow to "shrinkwrap" the roles associated with the table/columns of data. The figure below shows columns accessed per role per table or materialized view. The security and data assurance teams can also use the results to craft dynamic views or materialized views on top of physical tables.

Figure 10:
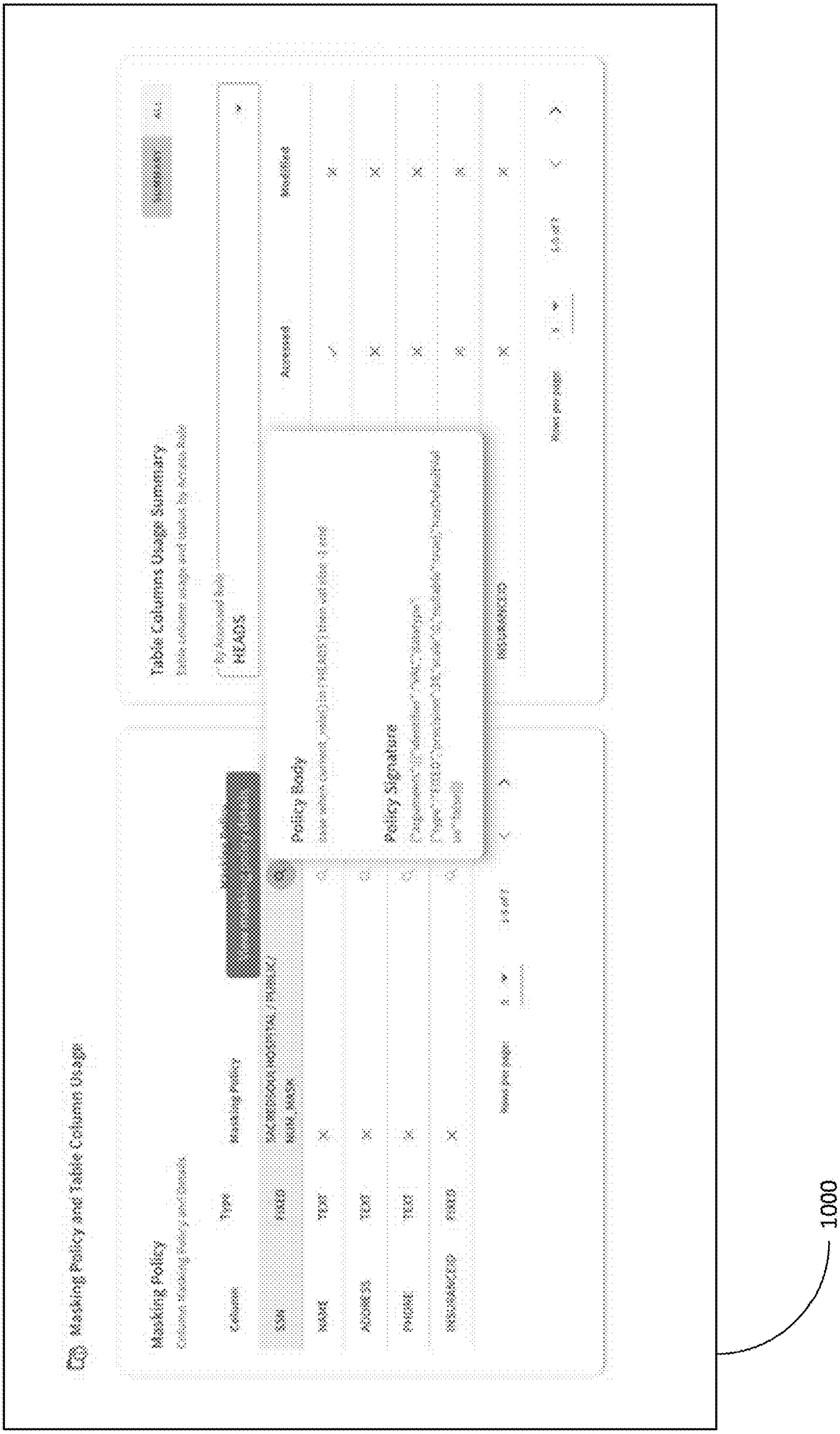
FIG. 10 illustrates an example screenshot showing the use of AI/ML algorithms to study the dynamic column value masking per role, according to some embodiments.

FIG. 10 illustrates an example screenshot 1000 showing the use of AI/ML algorithms to study the dynamic column value masking per role, according to some embodiments. In step 320, process 300 can use AI/ML algorithms to study the dynamic column value masking per role. This ensures customers do not have to duplicate data (saving cost and time and resources), give different users and machines access to the same table but mask out certain values of the data based on who they are versus returning unmasked data for the others. For example, in a company, some people with a certain job function like 19 validation may be able to access and validate an employee's social security number, but the other HR employees may not have a legitimate reason to access and modify the social security numbers of employees. So the same data may be fully masked or partially masked or unmasked dynamically depending on the job function/role of the accessing identity. Dynamic masking is a big feature in a lot of the financial and trading industries. The challenge the industry faces is ensuring governance of masking and whether the data is masked correctly. Process 300 can implement a machine with intelligence, can keep the data masked correctly based on the entity accessing the data without requiring the user to create expensive materialized views on top of the same physical table. Creating thousands of materialized views on the same physical table is expensive. This is why dynamic masking is so important, however, managing dynamic masking and detecting abuse of dynamic masking is extremely hard for humans to do manually. This is where process 300 steps in, and it can detect if dynamic masking is used correctly and detect breaches in the dynamic masking policy. For example, process 300 can detect if a user john can only access the masked value of SSN using a particular role, but john happens to have access to another role due to miss configuration and uses that role to access the unmasked value of SSN automatically.

To summarize, what the user or enterprise customer gets from process 300 is a system that automatically delivers the principle of least privilege (e.g. need-to-know basis) without breaking any application or workflow. This automatically inserts "bulkhead" walls between the different compartments of data inside a data store like Snowflake, just like submarines or ships have bulkheads to prevent flooding in one section filling up other areas of the ship or submarine and resulting in its sinking. Process 300 does this automatically inside a data store like Snowflake, limiting the damage an attacker can do inside the database even if he or she were to break in. Additionally, process 300 finds the most granular and optimal "bulkhead wall" placement and keeps updating them over time, something that is not done in the real world like in submarines or ships. Process 300 uses artificial intelligence and data analysis to deliver the above outcomes.

Machine learning (ML) can use statistical techniques to give computers the ability to learn and progressively improve performance on a specific task with data, without being explicitly programmed. Deep learning is a family of machine learning methods based on learning data representations. Learning can be supervised, semi-supervised or unsupervised. Machine learning is a type of artificial intelligence (AI) that provides computers with the ability to learn without being explicitly programmed. Machine learning focuses on the development of computer programs that can teach themselves to grow and change when exposed to new data. Example machine learning techniques that can be used herein include, inter alia: decision tree learning, association rule learning, artificial neural networks, inductive logic programming, support vector machines, clustering, Bayesian networks, reinforcement learning, representation learning, similarity, and metric learning, and/or sparse dictionary learning.

Machine learning is a type of artificial intelligence (AI) that provides computers with the ability to learn without being explicitly programmed. Machine learning focuses on the development of computer programs that can teach themselves to grow and change when exposed to new data. Example machine learning techniques that can be used herein include, inter alia: decision tree learning, association rule learning, artificial neural networks, inductive logic programming, support vector machines, clustering, Bayesian networks, reinforcement learning, representation learning, similarity, and metric learning, and/or sparse dictionary learning. Random forests (RF) (e.g. random decision forests) are an ensemble learning method for classification, regression, and other tasks, that operate by constructing a multitude of decision trees at training time and outputting the class that is the mode of the classes (e.g. classification) or mean prediction (e.g. regression) of the individual trees. RFs can correct for decision trees' habit of overfitting to their training set. Deep learning is a family of machine learning methods based on learning data representations. Learning can be supervised, semi-supervised or unsupervised.

Figure 11:
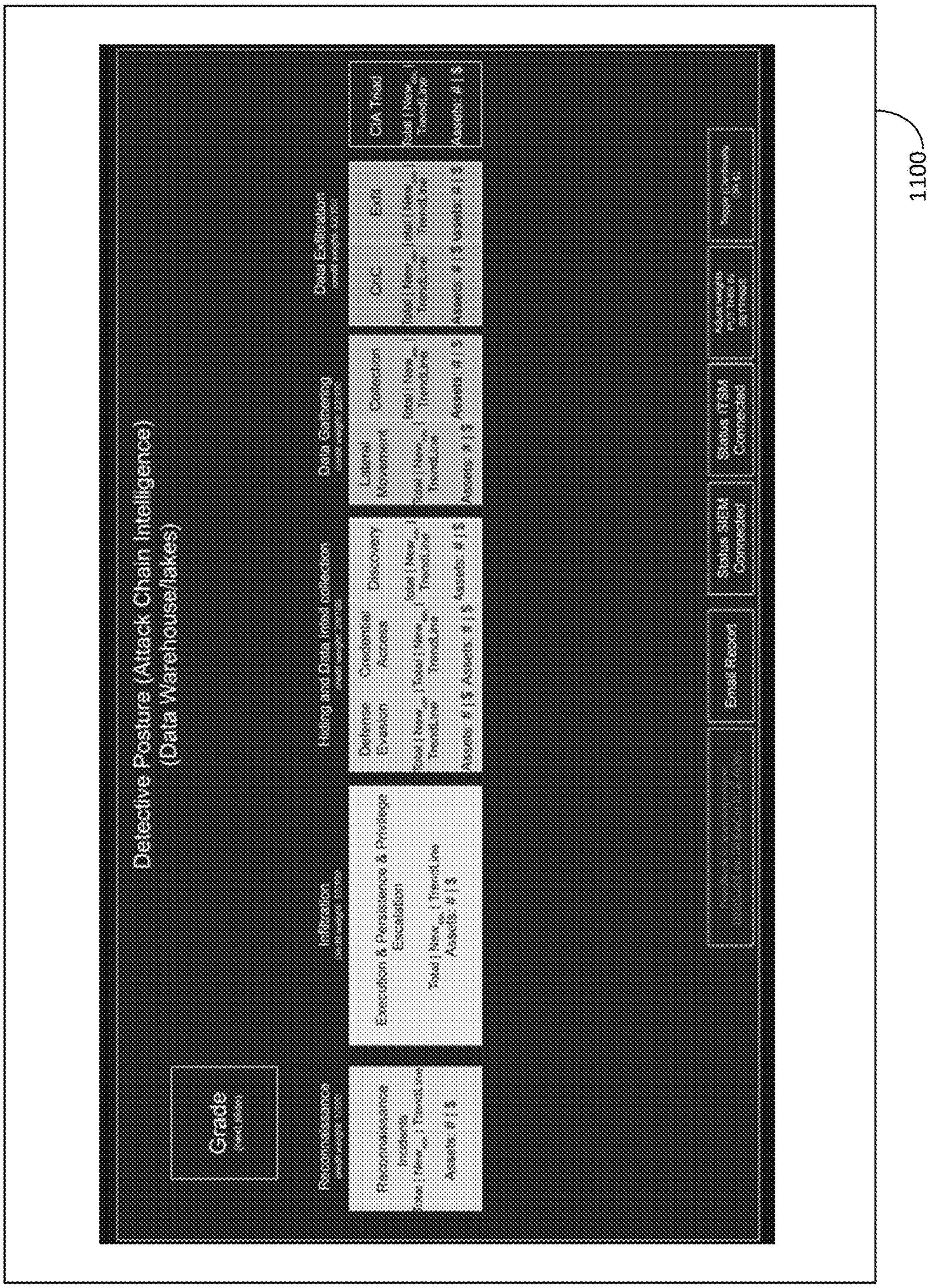
FIGS. 11-14 illustrates an example screenshot showing how reconnaissance and infiltration attempts can be quantified using the posture grades, according to some embodiments.

FIG. 11 illustrates an example process 1100 for implementing a reconnaissance phase of a cyberattack, according to some embodiments. In step 322, process 300 can implementing a reconnaissance phase of a cyberattack, according to some embodiments. Attacks and activity picked up by process 300 can identify attackers and/or malware probing the data store, attempting to see if there is a way to get in. In some examples, in this stage the attackers are probing the network access controls and the authentication and authorization system settings.

Process 300 identifies both human or machine-based probing attempts (and/or attacks). Process 300 classifies their geo-location, IP address, ASN, etc. Process 300 also identifies where the probes are coming from. This data can be compared with normal behavior.

Step 324 can provide an early warning heads-up to the defenders if any of the system parameters need to be tightened. This can be akin to a fighter jet detecting that it is having its radar painted, telling the pilot to take defensive and evasive maneuvers before the targeting and fire control systems can establish a lock. Similarly, process 300 uses the probes to determine whether there is undue or new interest in the data store and from where.

Process 300 also studies the type of probe failures to identify, which user's account is being used, and what type of probe failures are being picked up. This provides an early indicator of the set of TTPs the attacker may use. All of this feeds into the attack lifecycle analyzer and grading system.

Figure 12:
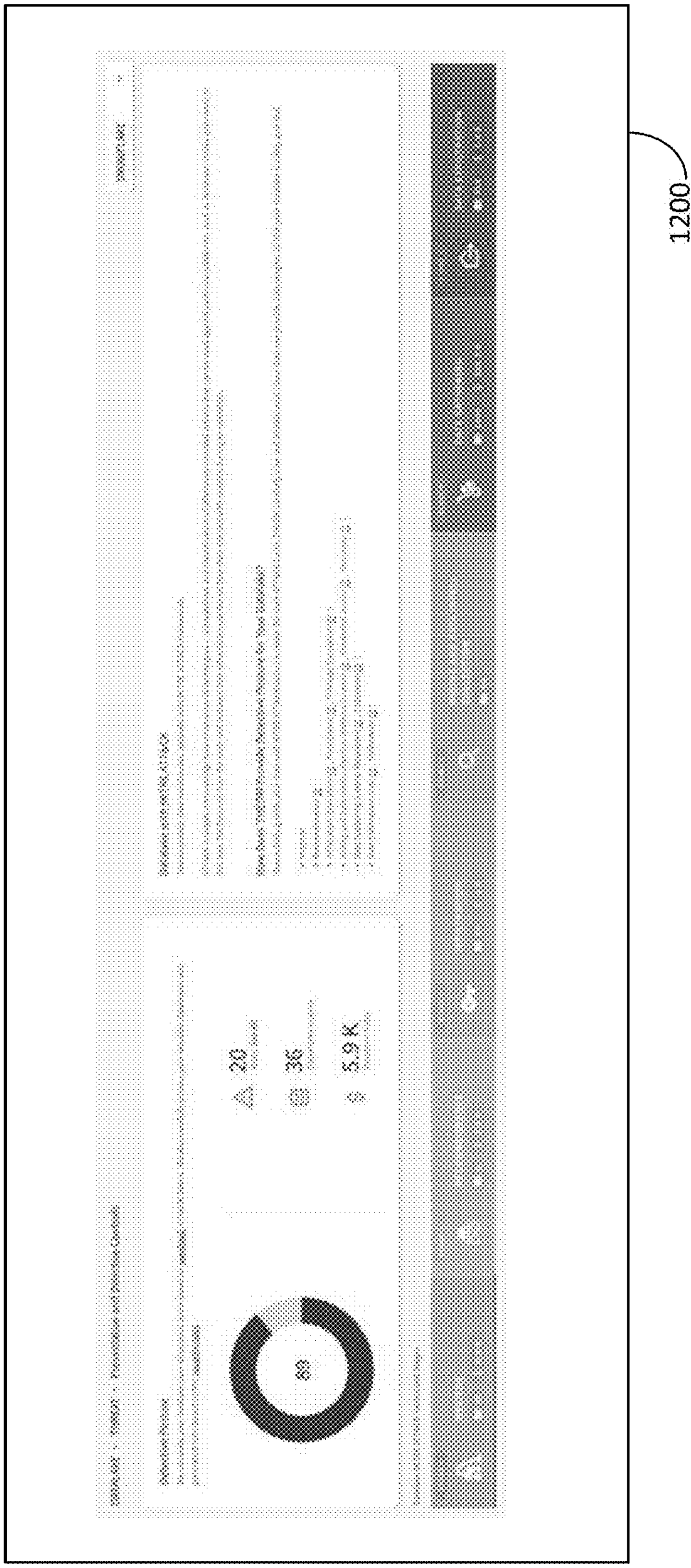
Figure 13:
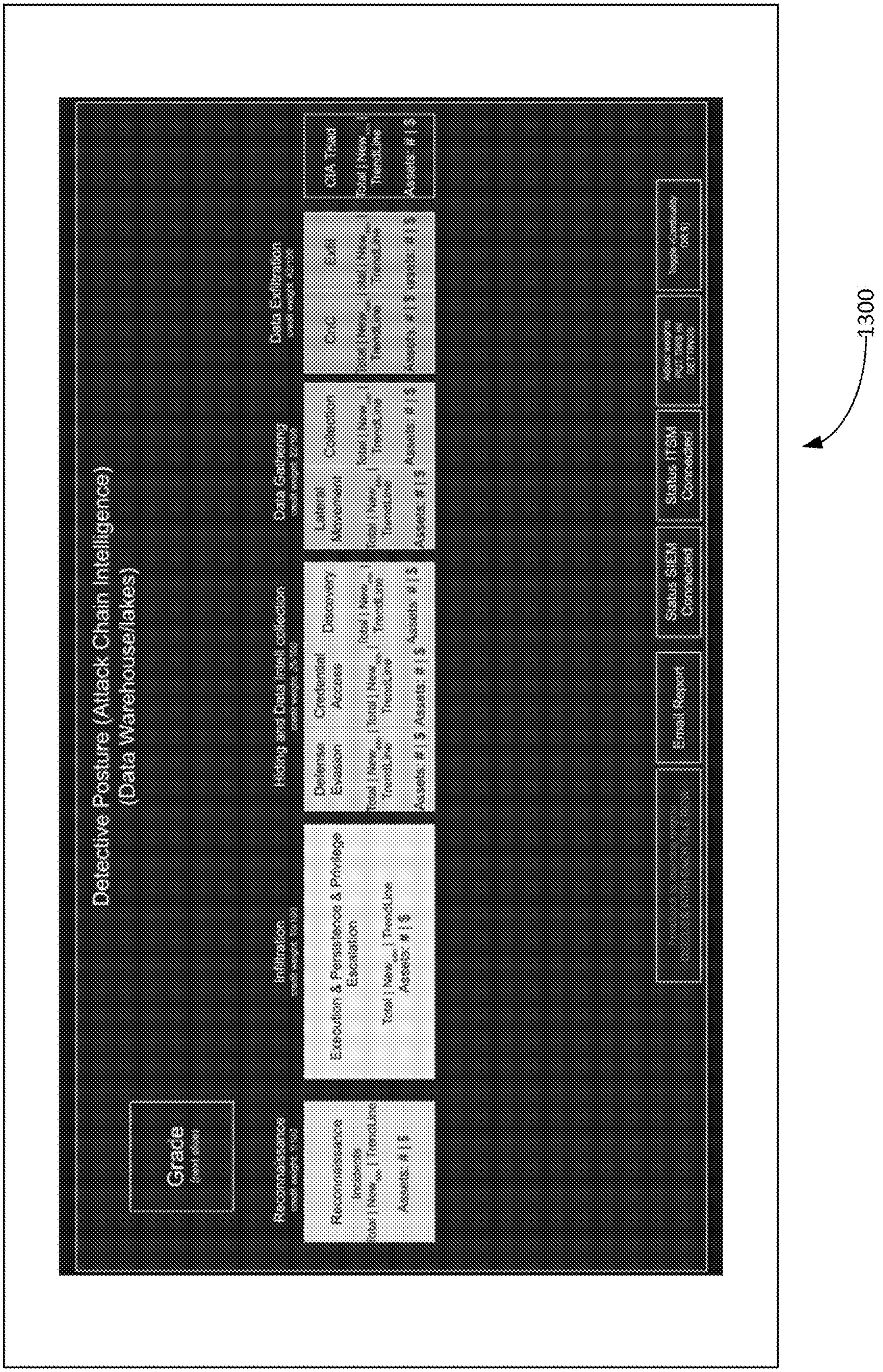
Figure 14:
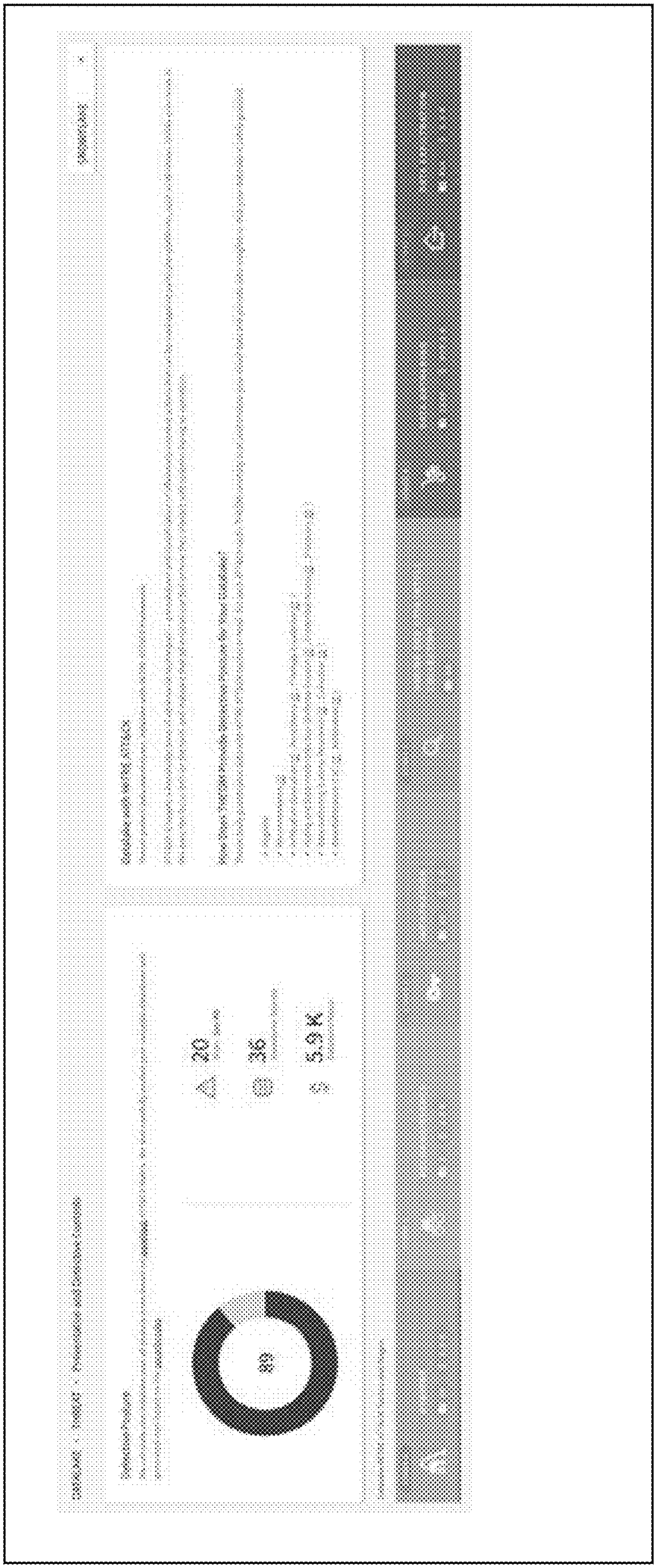

FIG. 12 illustrates an example process 1200 for implementing infiltration phase of a cyberattack, according to some embodiments. In step 326, process 300 implements an infiltration phase of a cyberattack. In this step of the attack, process 300 detects the attacker or malware entering into the data store, establishing persistence or elevating its privilege to get to the data of interest.

In step 328, starts with making the entry, that is execution of the beachhead part of the attack. In this step, the attacker successfully gains a toehold inside the data store. After execution the attackers or the malware immediately try to establish persistence. Though persistence is not always required, this step is considered essential by most attackers or malware so that they can get back into the system if an unforeseen incident happens, like the Snowflake service is restarted/relocated or the network connection gets dropped.

In some examples, the account with which the attacker or malware enters the entity's computer system(s), often may not be a highly privileged account and/or the entry account may not have the right privileges to get to the data the attacker has an interest in (e.g. assuming the attacker knows what they are after from the very beginning, sometimes this step can occur after Data Intelligence collection). In cases like this, the attacker and/or malware has to execute a privilege elevation attack through one or more intermediate accounts or grant itself the right privileges till it gets sufficient privileges to get to the data of interest. This step is called privilege escalation.

FIGS. 11-14 illustrates an example screenshot 1100-1400 showing how reconnaissance and infiltration attempts can be quantified using the posture grades (e.g. see example grade calculations infra), according to some embodiments.

Figure 15:
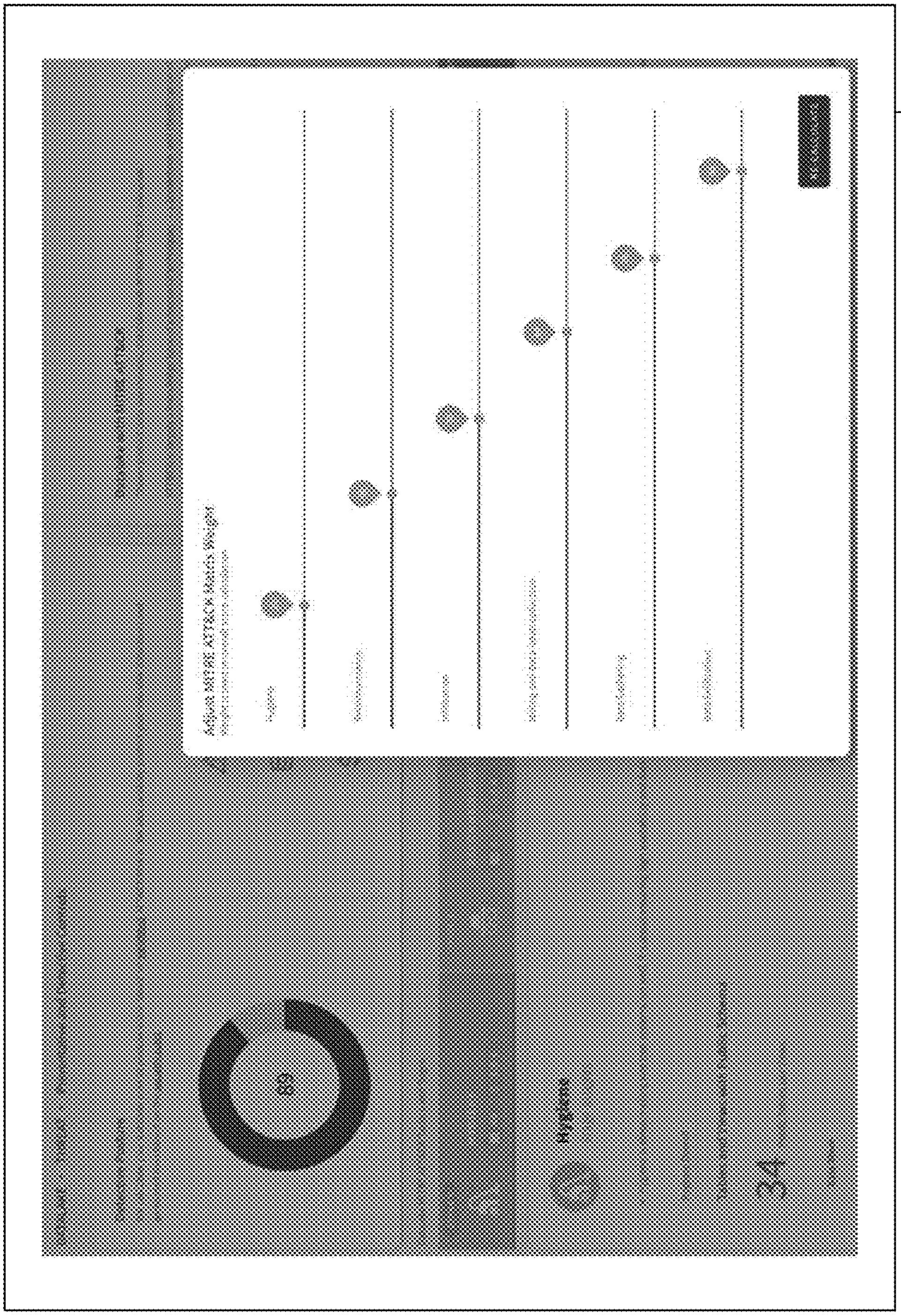
FIG. 15 illustrates an example screenshot showing MITRE attack and Common Knowledge (CK) matrix weight adjustments, according to some embodiments.

FIG. 15 illustrates an example screenshot 1500 showing MITRE attack and Common Knowledge (CK) matrix weight adjustments, according to some embodiments. The overall score is driven by how the user/customer weighs in scores for the different steps in the larger framework (e.g. as can be seen in the FIG. 15) the overall attack posture weight is computed based on the individual weights in the Mitre ATT&CK framework.

Example Grade Calculations

The following grade calculation information can be utilized herein (e.g. to generate information associated with screenshot 1500, etc.).

Normalizer=1/Stage Event Count Historical Max

/*Comment: saturate it or put smart seed defaults for each stage. e.g. login attempts fails start with 100 a day*/

Stage numeric grade=1−[stage event count*normalizer]

The amplification weight for each stage is defined as the inverse inclusion probability. Use that to scale. See the figure above for the default amplification weights for each stage. The user can change the weights if needed.

Total numeric GPA=(Stage Weight Credit*Stage Grade numeric score)/(Total Stage Grade numeric score).

Conversion to the Letter GPA uses this table:

Letter/Grade Percentage Or decimal/GRADE NUMERIC SCORE

| | | |
|---|---|---|
| A+ | 97-100 | 4.0 |
| A | 93-96 | 4.0 |
| A− | 90-92 | 3.7 |
| B+ | 87-89 | 3.3 |
| B | 83-86 | 3.0 |
| B− | 80-82 | 2.7 |
| C+ | 77-79 | 2.3 |
| C | 73-76 | 2.0 |
| C− | 70-72 | 1.7 |
| D+ | 67-69 | 1.3 |
| D | 65-66 | 1.0 |
| E/F | Below 65 | 0.0 |

Prevalence Hash Functionalities

Figure 16:
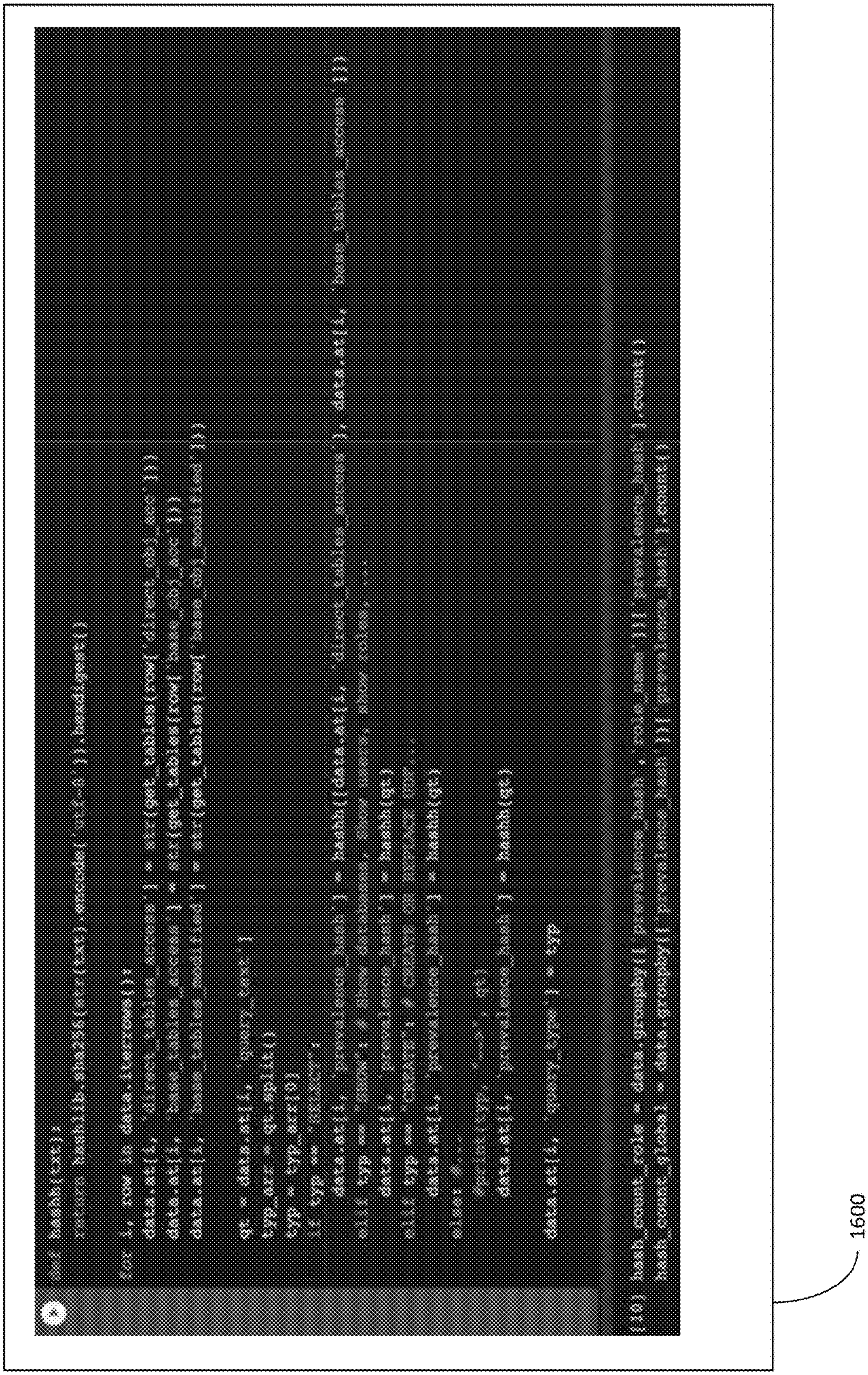
FIGS. 16-18 provide example screenshots for implementing prevalence hashes, according to some embodiments.
Figure 17:
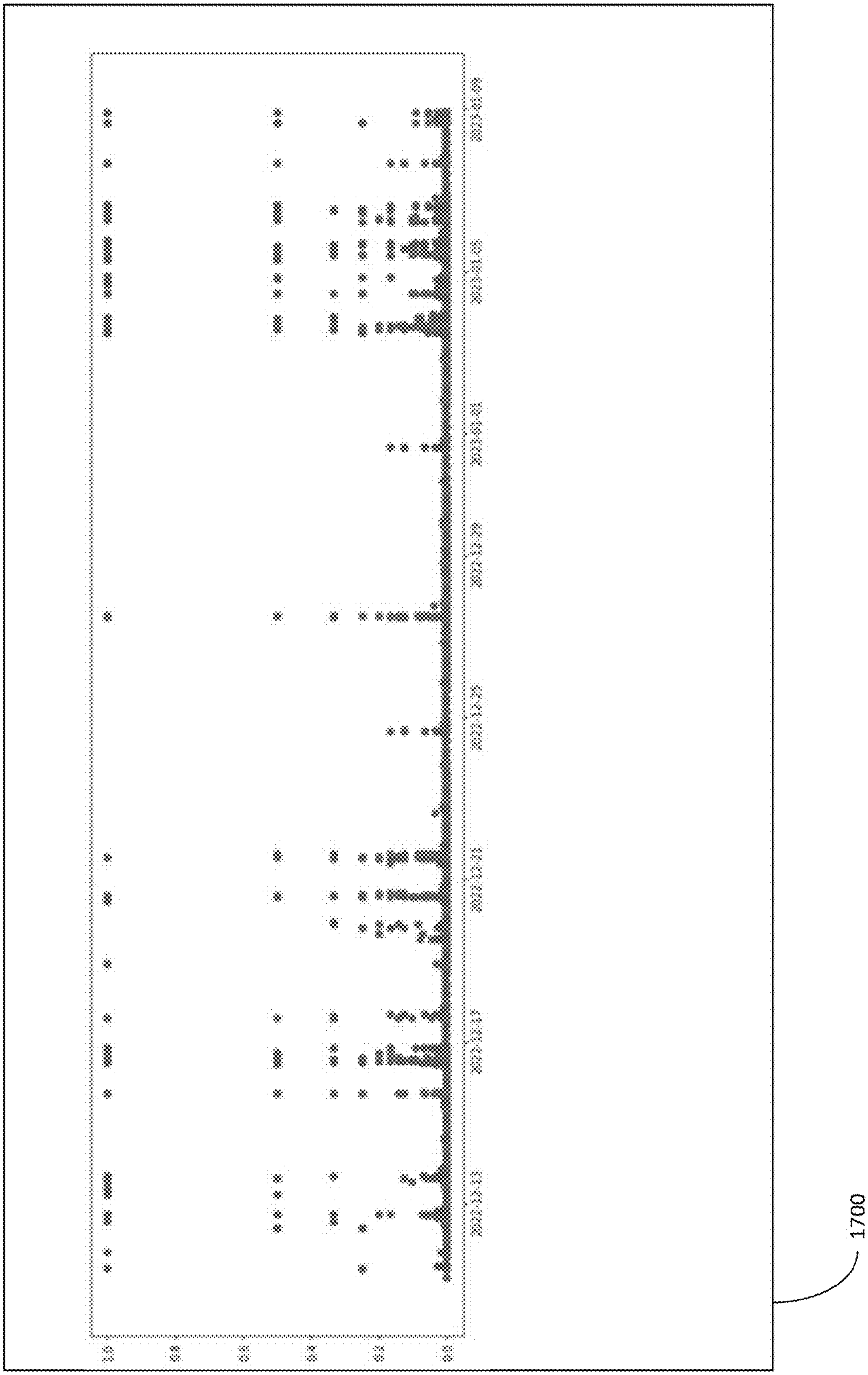
Figure 18:
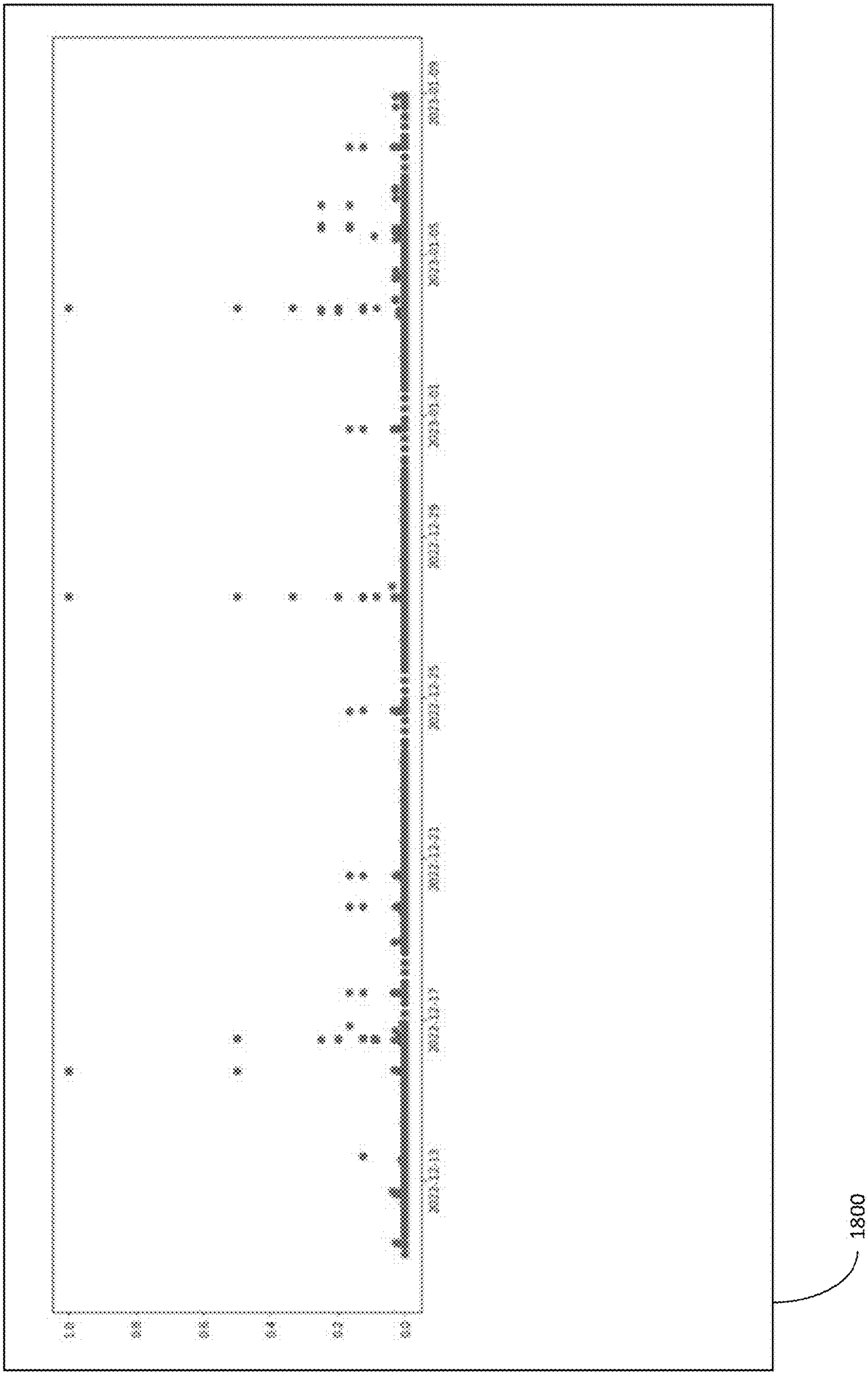

FIGS. 16-18 provide example screenshots 1600-1800 for implementing prevalence hashes, according to some embodiments. A prevalence hash is now discussed. A prevalence hash can be used to identify if similar activities are happening often versus if the activity or the event seen is common. A prevalence hash can be used to "pick up the needle from a haystack" from activities that map to the attack framework.

Screen shot 1600 illustrates an example hash computation implemented with a prevalence hash. Screen shots 1700-1800 illustrate an example screen shots showing global prevalence for all query types over an example last month and last one is global prevalence for select query types over the example last month. As shown, depending on the attack stage detection the appropriate features are used as discussed infra (e.g. with respect to attack sections). For example, example functions such as direct_tables_access and base_tables_access can be utilized.

Dashboard Functionalities

Figure 19:
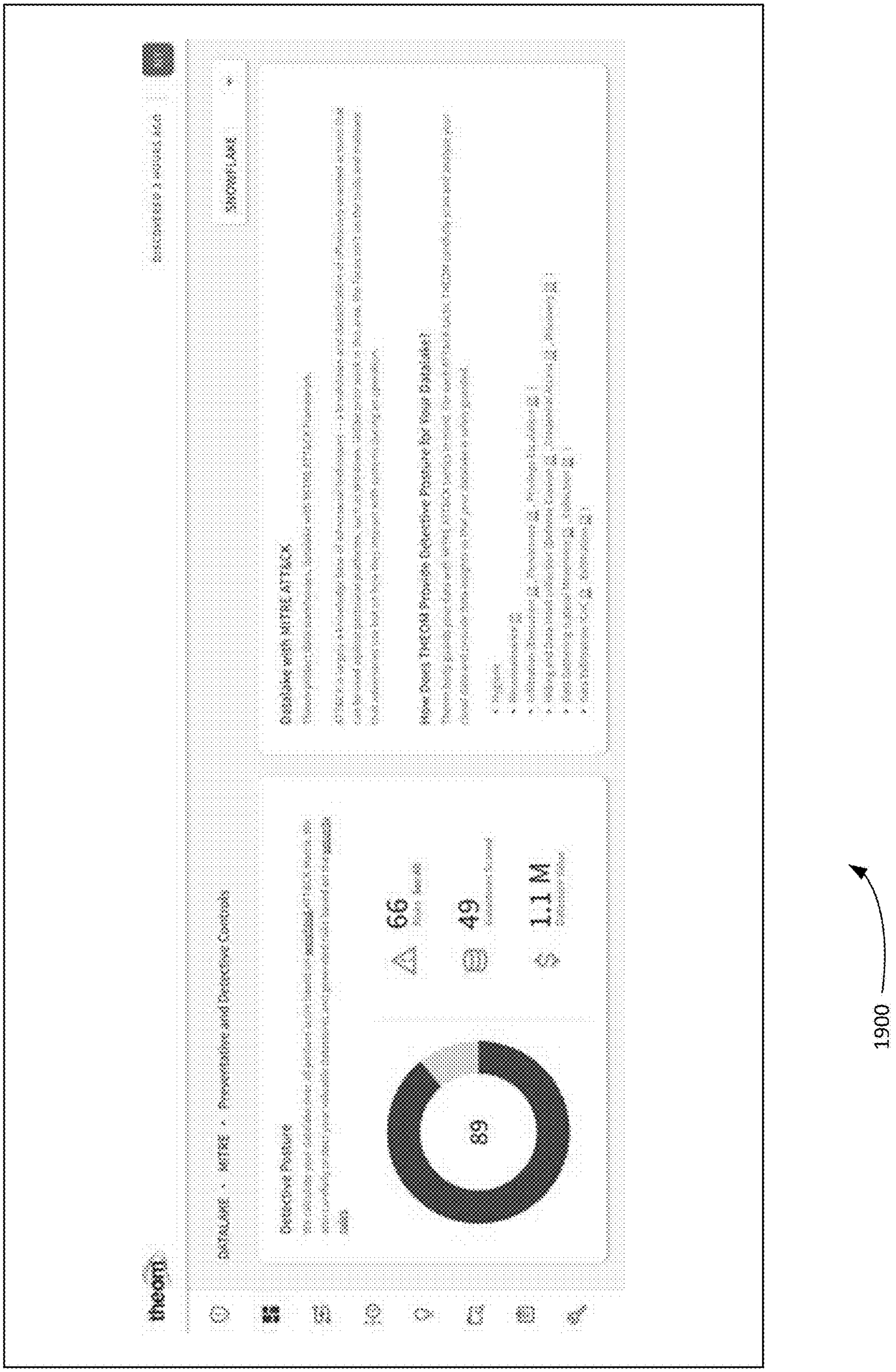
FIGS. 19-20 illustrates an example screen shots showing additional dashboard functionalities, according to some embodiments.
Figure 20:
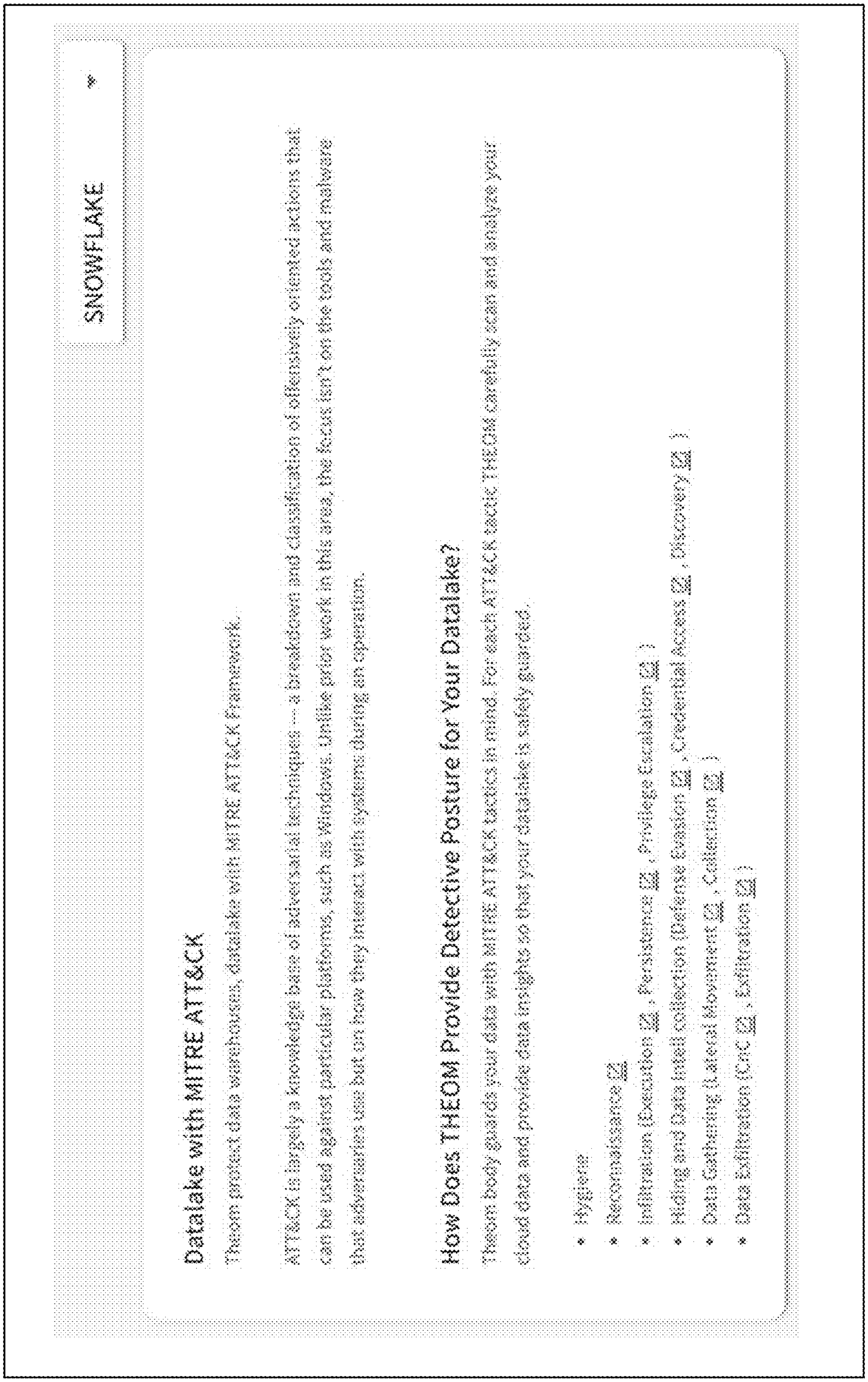

FIGS. 19-20 illustrates an example screen shots 1900-2000 showing additional dashboard functionalities, according to some embodiments.

Attack Phase: Reconnaissance Attack Detection

Figure 21:
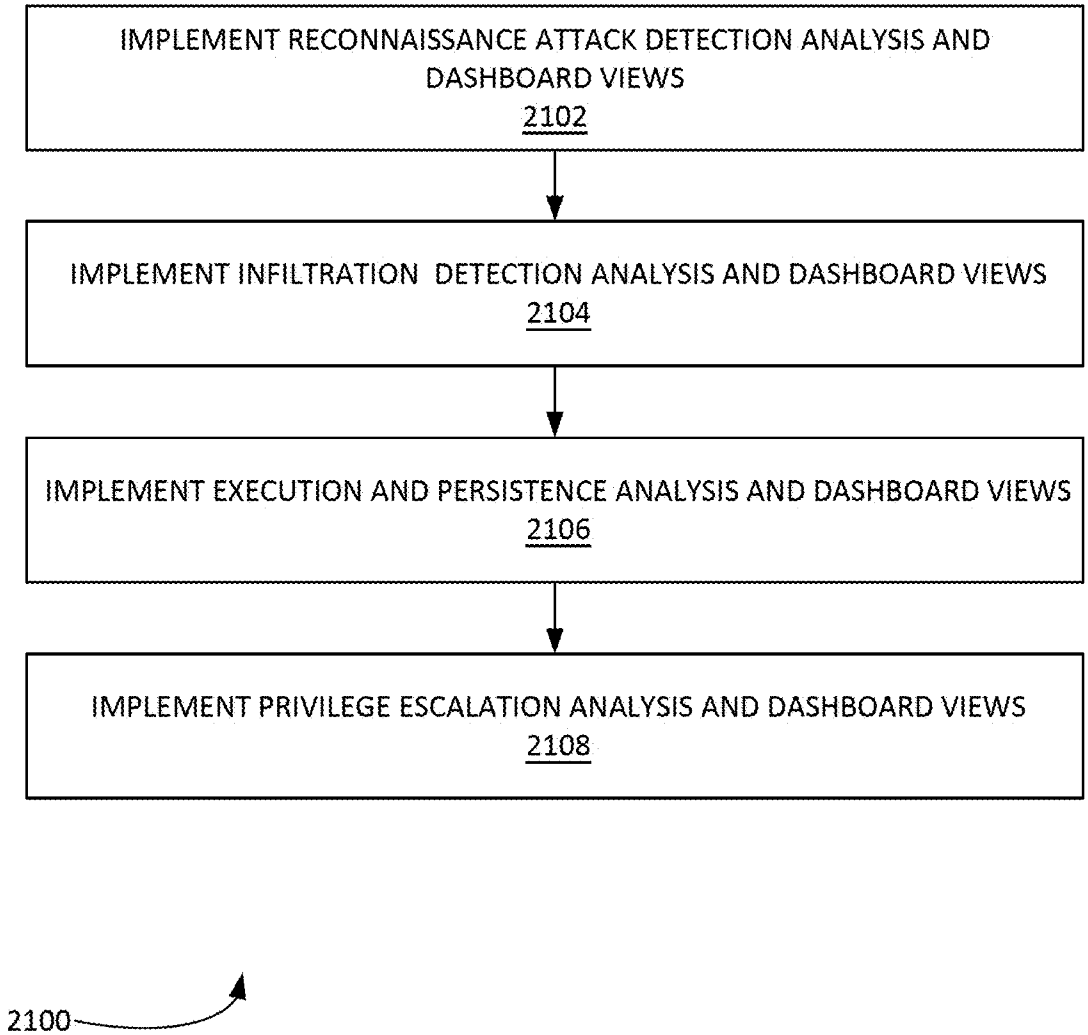
FIG. 21 illustrates an example process for reconnaissance attack detection, according to some embodiments.

FIG. 21 illustrates an example process 2100 for reconnaissance attack detection, according to some embodiments. In step 2102, process 2100 can implement reconnaissance attack detection analysis and dashboard views. In step 2104, process 2100 can implement infiltration detection analysis and dashboard views. In step 2106, process 2100 can implement execution and persistence analysis and dashboard views. In step 2108, process 2100 can implement privilege escalation analysis and dashboard views. The following FIGS. 22-25 illustrate example screenshots that can be implemented using process 2100.

Figure 22:
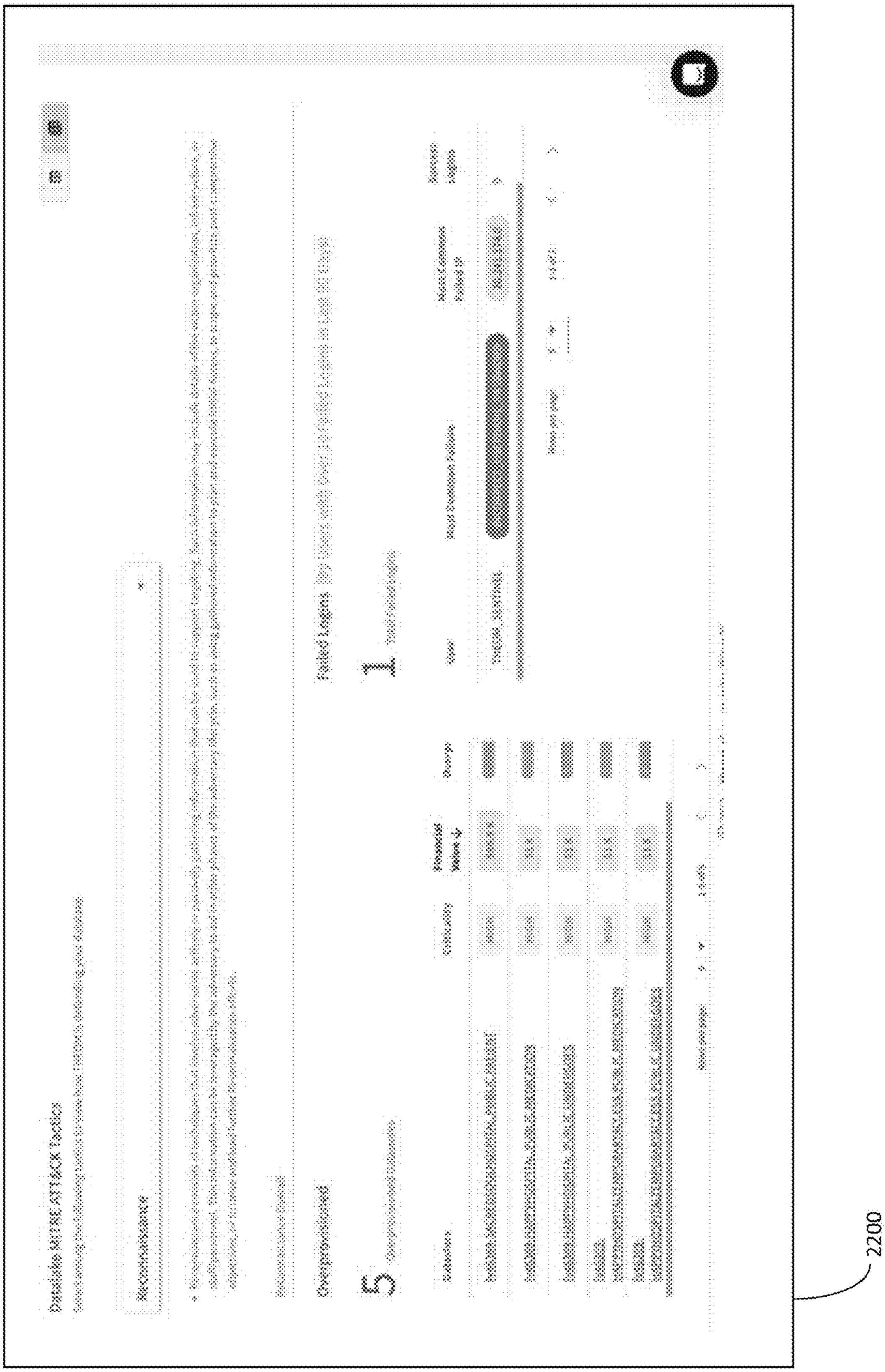
FIGS. 22-23 illustrates an example screenshots of reconnaissance attack detection, according to some embodiments.
Figure 23:
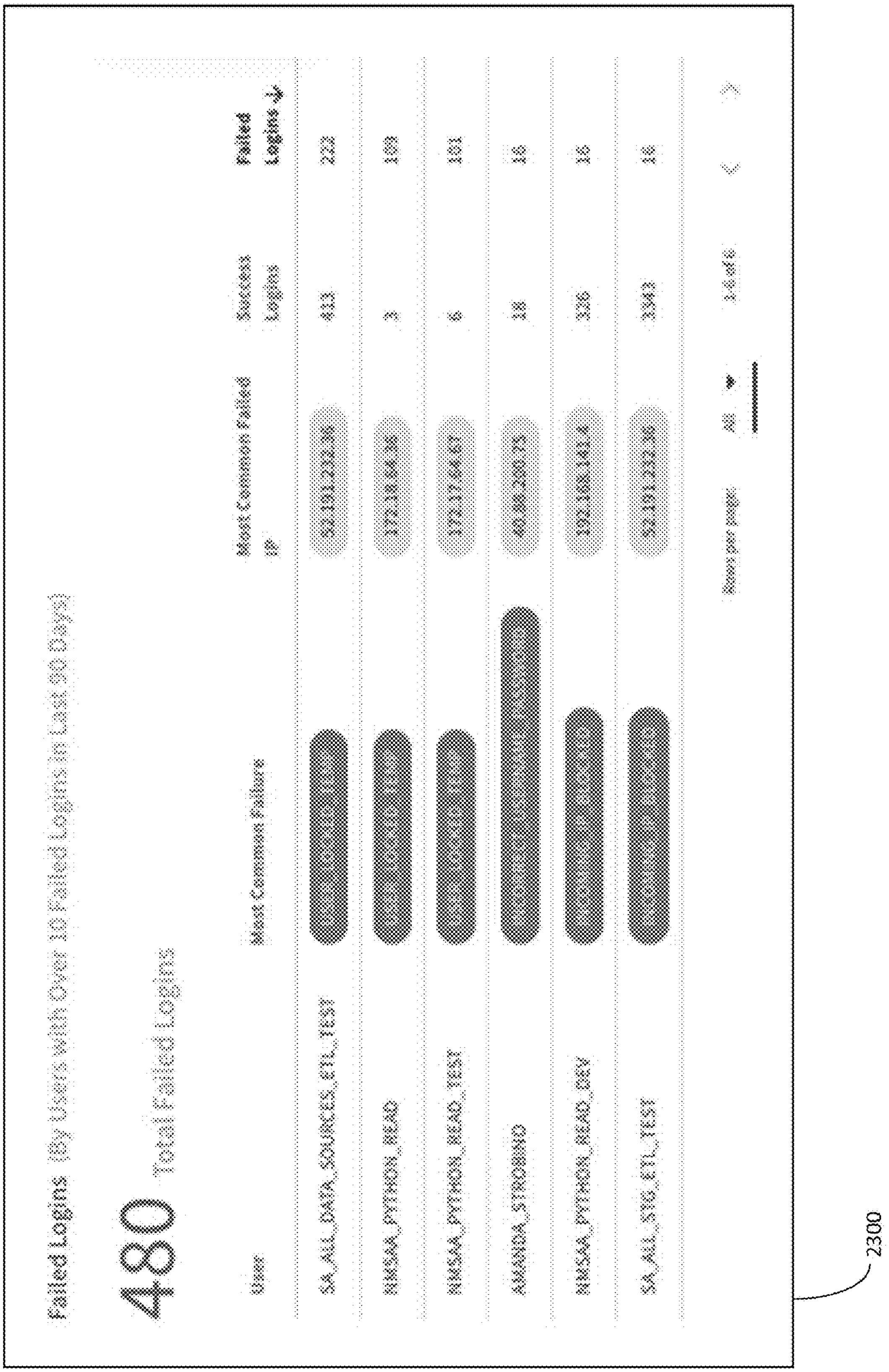

FIGS. 22-23 illustrates an example screenshots 2200-2300 of reconnaissance attack detection, according to some embodiments. The systems and methods provided herein track failed logins, specifically, login attempts that are failing due to a wide variety of reasons (FIG. 23 provides some examples). Furthermore, an association of the degree of provisioning to the failed login attempts becomes necessary to assess the impact of such repeated failures.

FIGS. 24-25 illustrate example tables 2400-2500 used for reconnaissance attack detection, according to some embodiments. In some examples, reconnaissance attack detection can be programmatic (e.g. using ODBC, JDBC, Python, SnowSQL, etc.). Examples of programmatic reconnaissance attack detection can include, inter alia: Failed Logins (e.g. by Evaluating error codes); Blocked IPs/Geo IP/Private IP (e.g. using AWS VPC Interface endpoints and Azure Private endpoints) as well as block Private link(s) (e.g. using Azure VNet, AWS VPC, Google Cloud Private Service connect); use of allowed IP list/Geo IP, etc. Other sources that can be used include, inter alia: Federated Authorizations/SSO; Key Pair Authorization and Key Pair Rotation; MFA; OAuth, user source (e.g. using Snowsight, SnowUI, etc.).

Attack Phase 2: Infiltration

Figure 26:
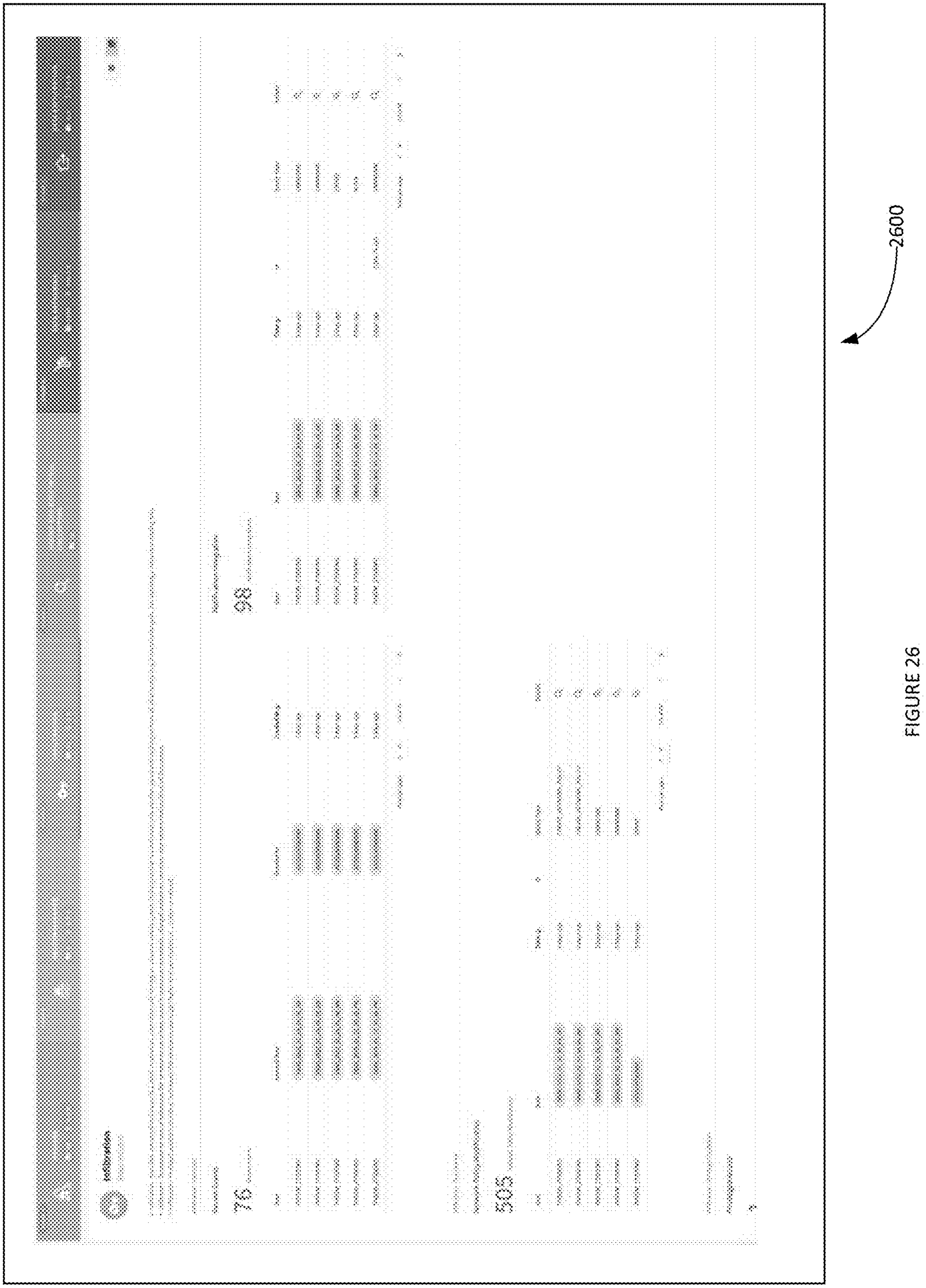
FIGS. 26-27 illustrate example screenshots for infiltration detection, according to some embodiments.
Figure 27:
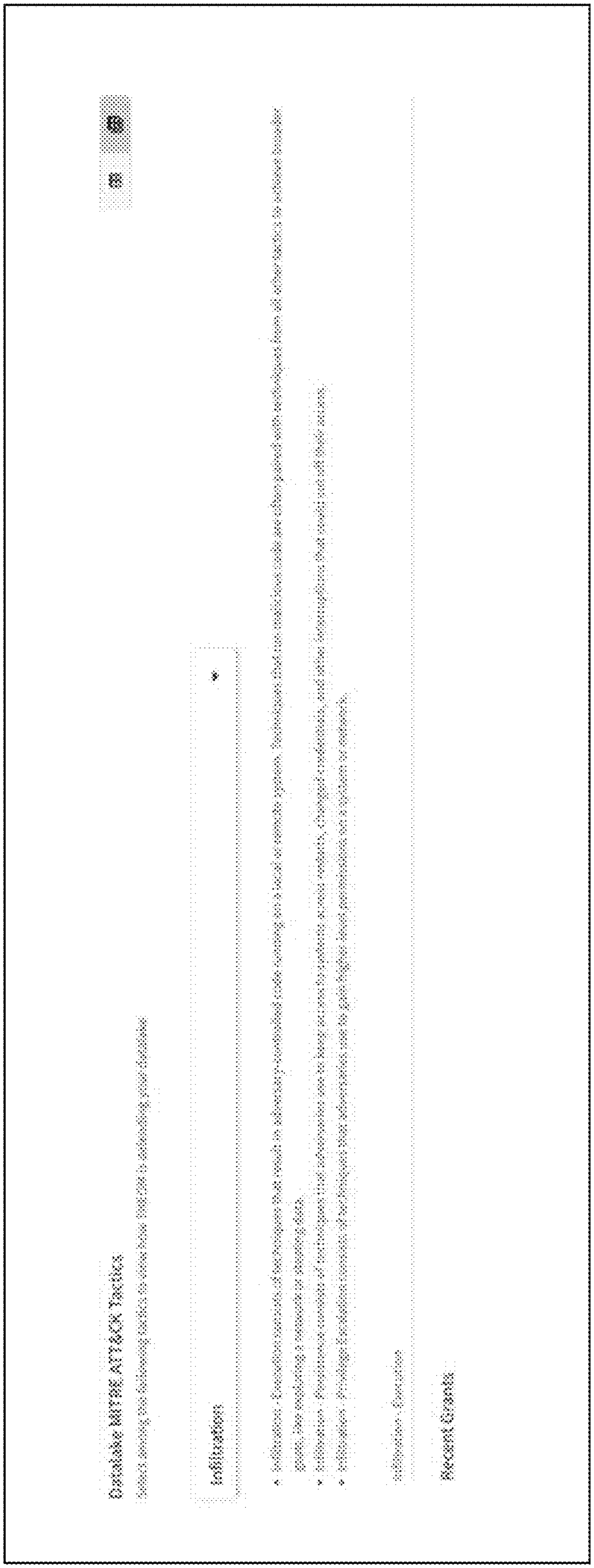

FIGS. 26-27 illustrate example screenshots 2600-2700 for infiltration detection, according to some embodiments.

Execution and Persistence Phase

Figure 28:
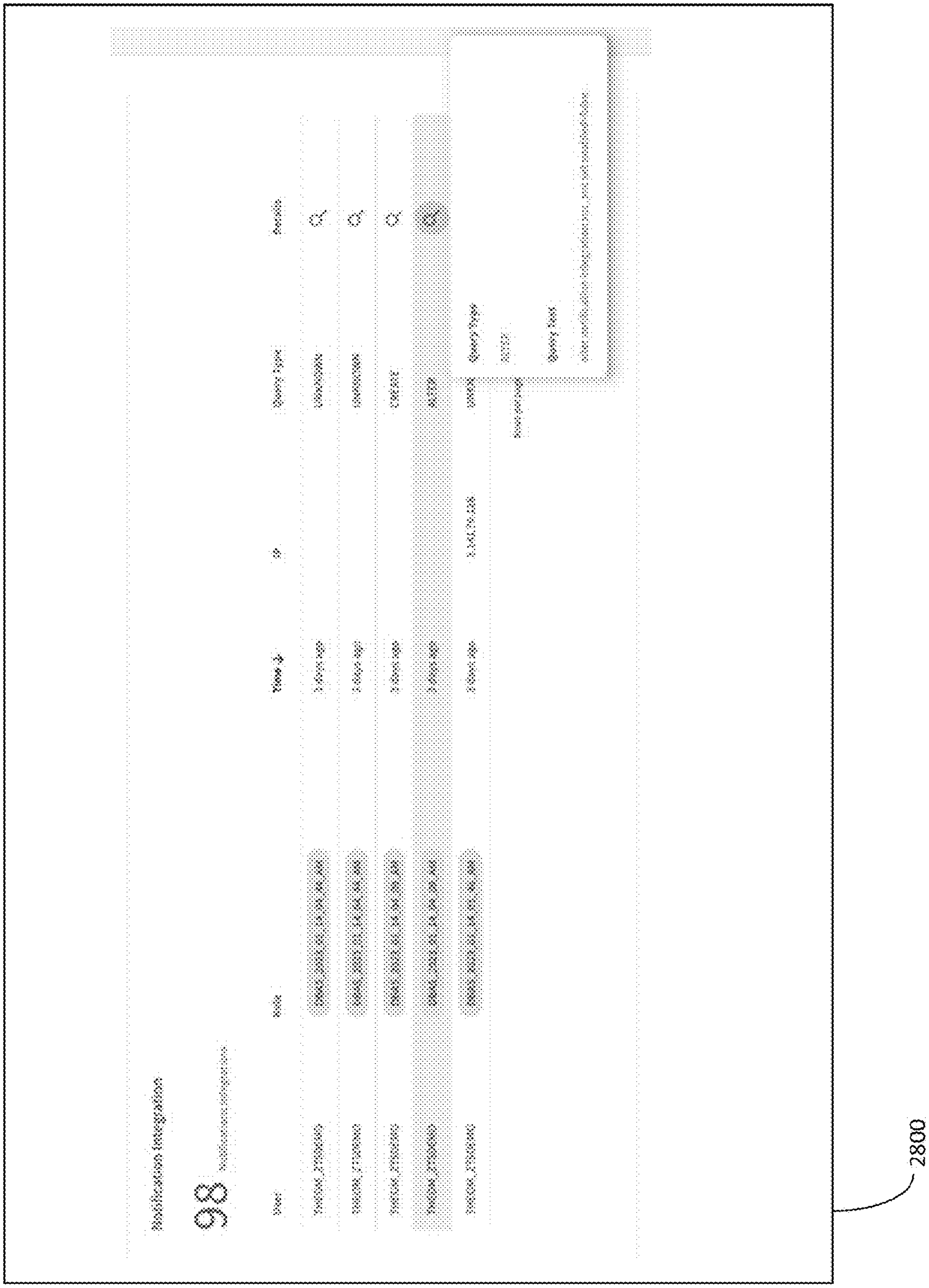
FIGS. 28-29 illustrate example screenshots for execution and persistence analysis and detection, according to some embodiments.
Figure 29:
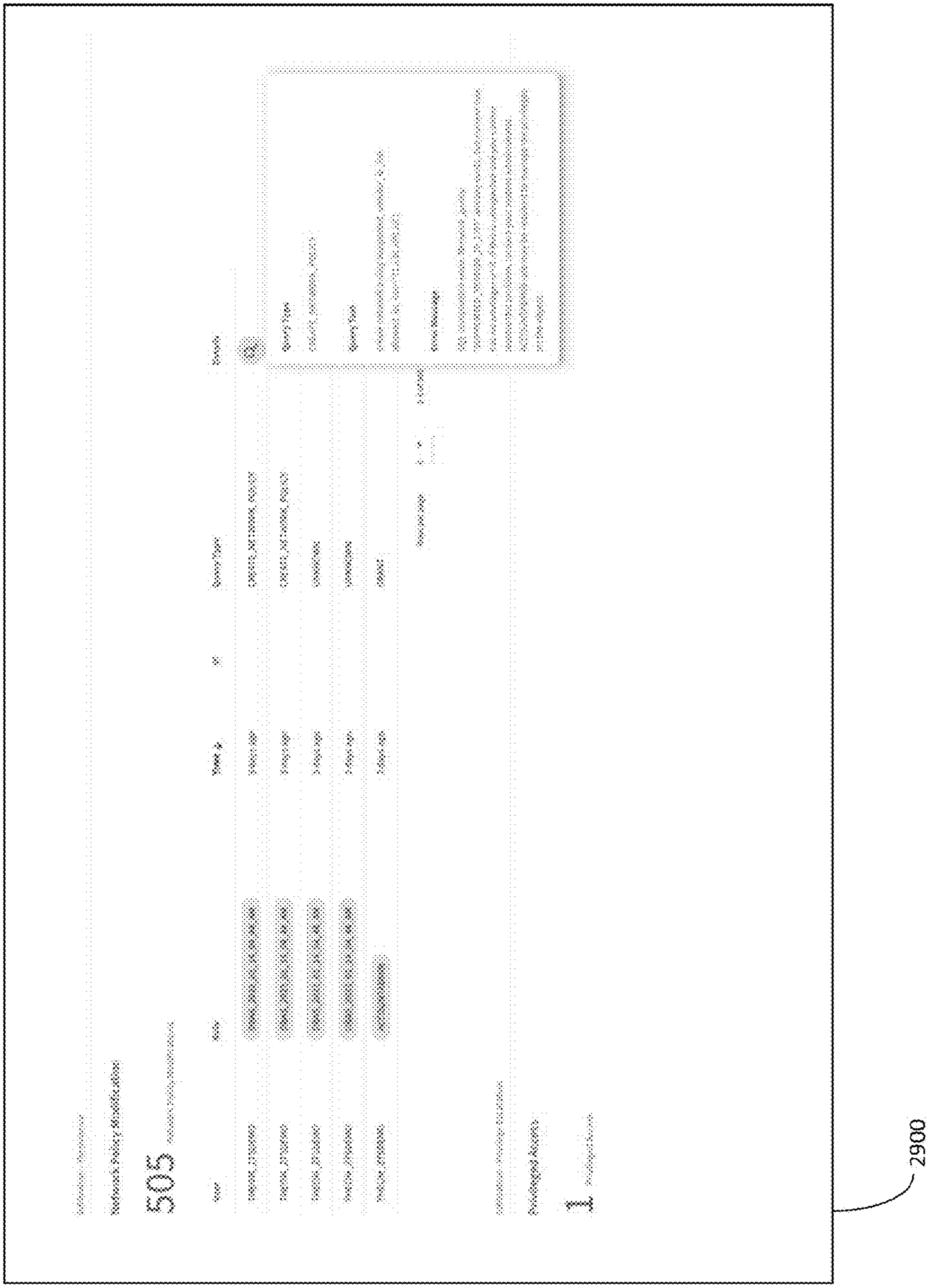

FIGS. 28-29 illustrate example screenshots 2800-2900 for execution and persistence analysis and detection, according to some embodiments. This phase of the attack starts with the attacker making an entry into a data store. The attacker can execute the breach head part of the so that the attacker successfully gains a toehold inside the data store. After the attacker obtains this posture, the attacker and/or malware can executes a sequence of steps to establish persistence. Though persistence is not always required, establishing persistence makes the job of the attacker simpler so that they can get back into the system reliably. In one example, an unforeseen incident happens like the cloud computing-based data cloud service (e.g. Snowflake®, etc.) is restarted/relocated or the network connection is dropped, the attacker may not have to execute the whole attack sequence again, and risk detection.

The following list of features can be abused by attackers to infiltrate. These can be utilized to detect infiltration. 1. Create/Alter Account Objects: API integration; connection; database; database/clone; network policy; notification integration; resource monitor; role; security integration; share; storage integration; user; warehouse. 2. Call/UDF: new procedure; anonymous procedure. 3. Create/Alter Database Objects: external function; external table; file format; file format/clone; function; masking policy; materialized view; password policy; pipe; procedure; row access policy; schema; schema/clone; sequence; sequence/clone; session policy; stage; stage/clone; stream; stream/clone; table; table/clone; tag; task; task/clone; view. 4. Create/Alter Security Integration: external OAUTH; OAUTH; SAML2; SCIM. 5. Execute Immediate: SQL; procedure call; control-flow; block. 6. Task: create; execute; alter.

Privilege Escalation

A privilege escalation attack can be a cyberattack designed to gain unauthorized privileged access into a system. Cyber attackers can attempt to exploit various human behaviors, gaps in operating systems or applications and/or system design flaws. Privilege Escalation operations can involve, inter alia: granting various state (e.g. ownership, roles, privileges to role, privileges to share, etc.); creation of session policies (e.g. idle timeout, idle timeout UI, etc.).

Other Screenshots

Figure 30:
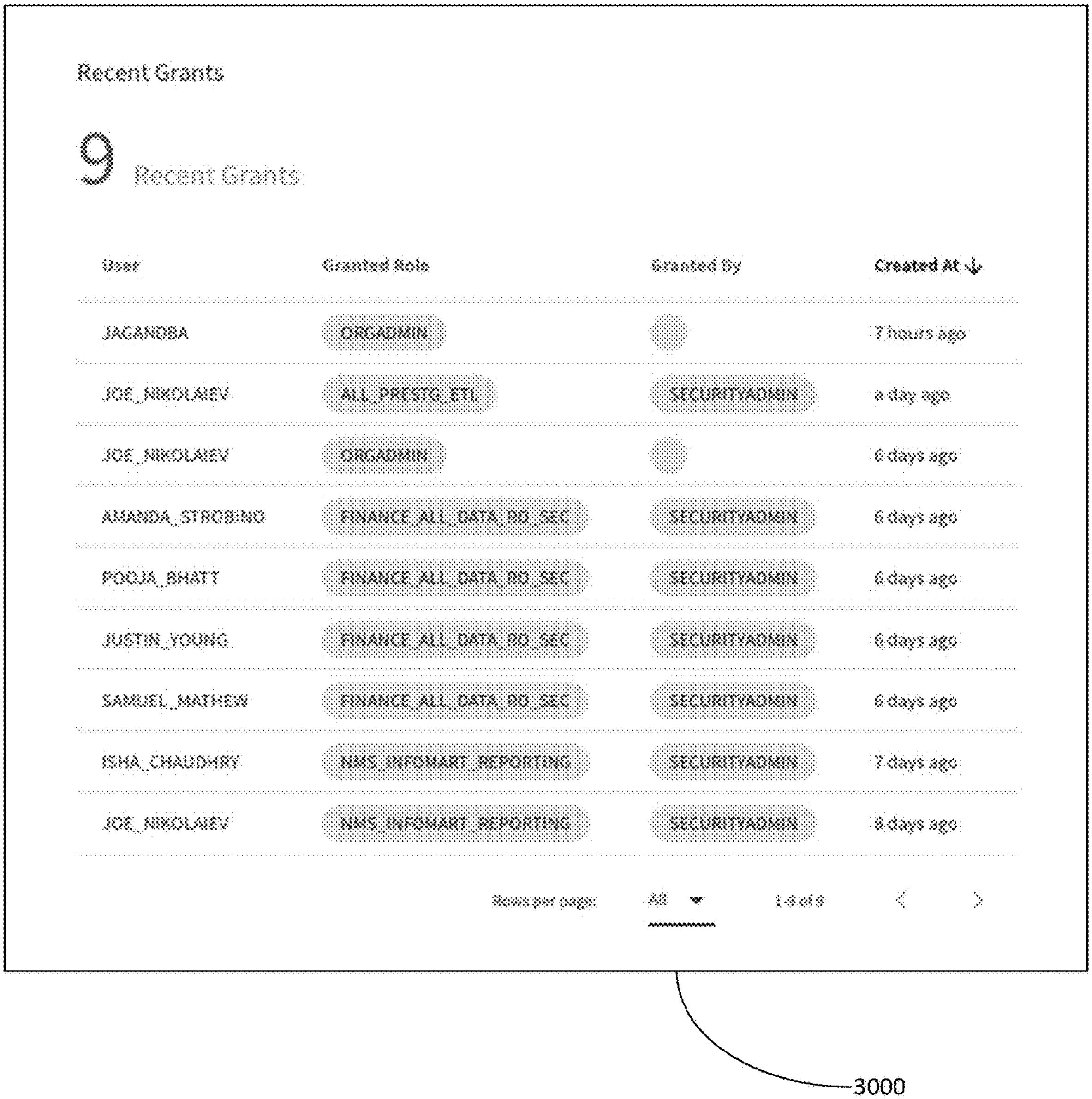
FIG. 30 illustrates an example screenshot showing recent logins, according to some embodiments.

FIG. 30 illustrates an example screenshot 3000 showing recent grants, according to some embodiments. The recent grants module tracks the recent permissions and privileges that have been granted within the data lake. The grants provide details of privileges that have been given so that any access to sensitive tables can be tracked and alerted on as an event.

Figure 31:
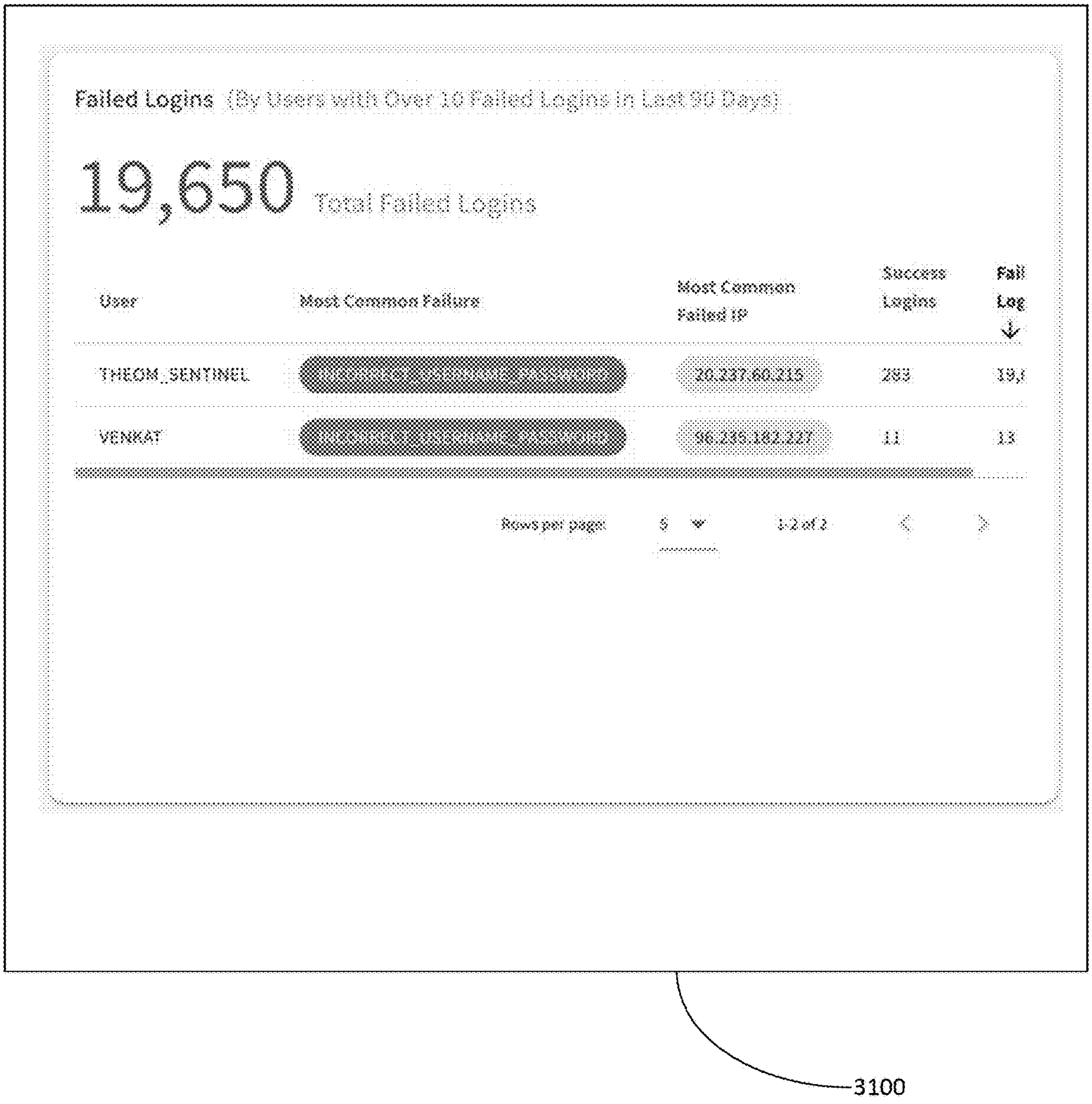
FIG. 31 illustrates an example screenshot showing failed logins, according to some embodiments.

FIG. 31 illustrates an example screenshot 3100 showing failed logins, according to some embodiments. Repeated failed logins and a regular pattern of a large amount of failed logins can indicate attack patterns. The ratio of successful to failed is also a good indicator of wrong intent and can be seen in this figure.

Figure 32:
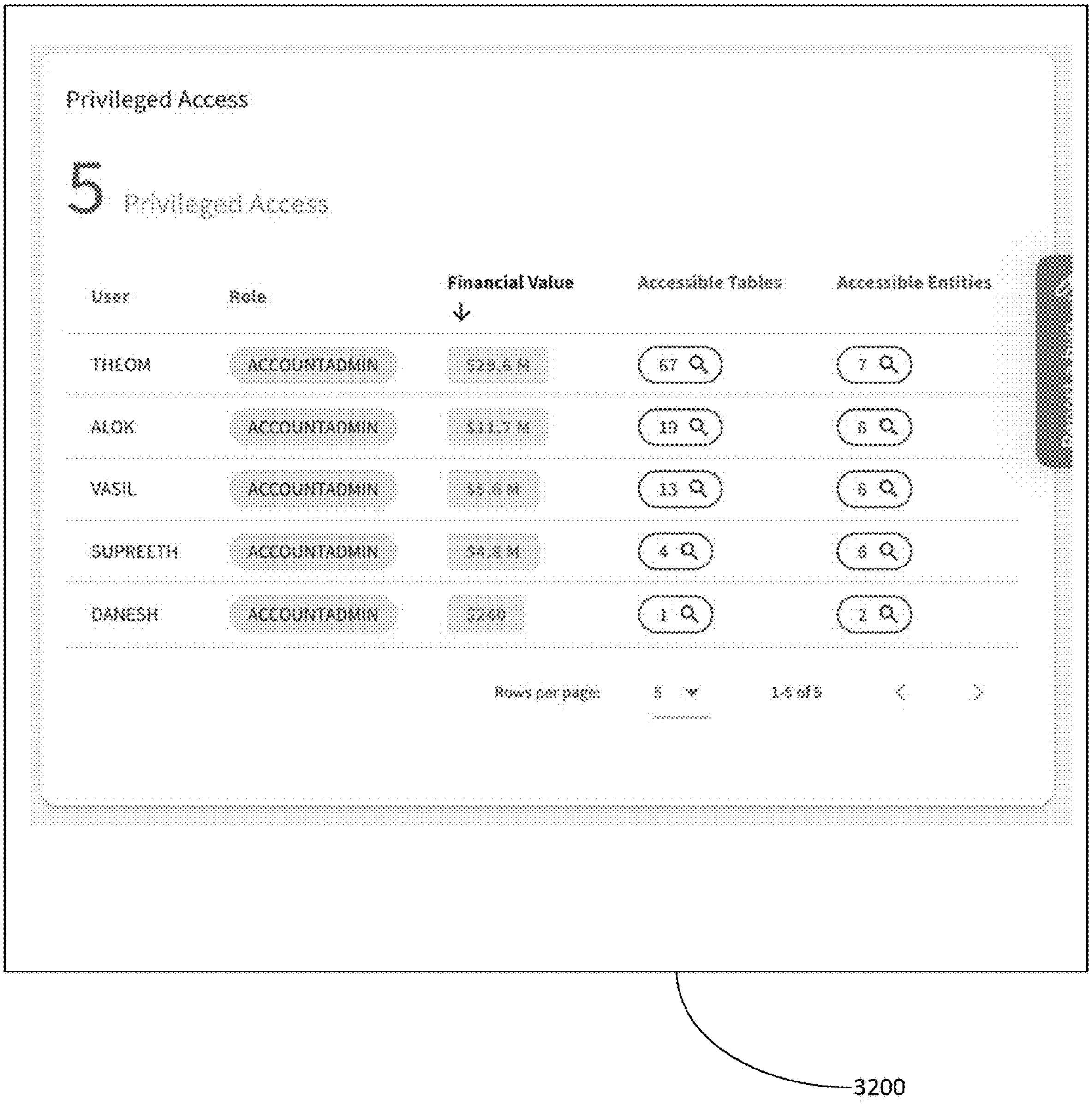
FIGS. 32-34 illustrates an example screenshot showing privilege access, according to some embodiments.
Figure 33:
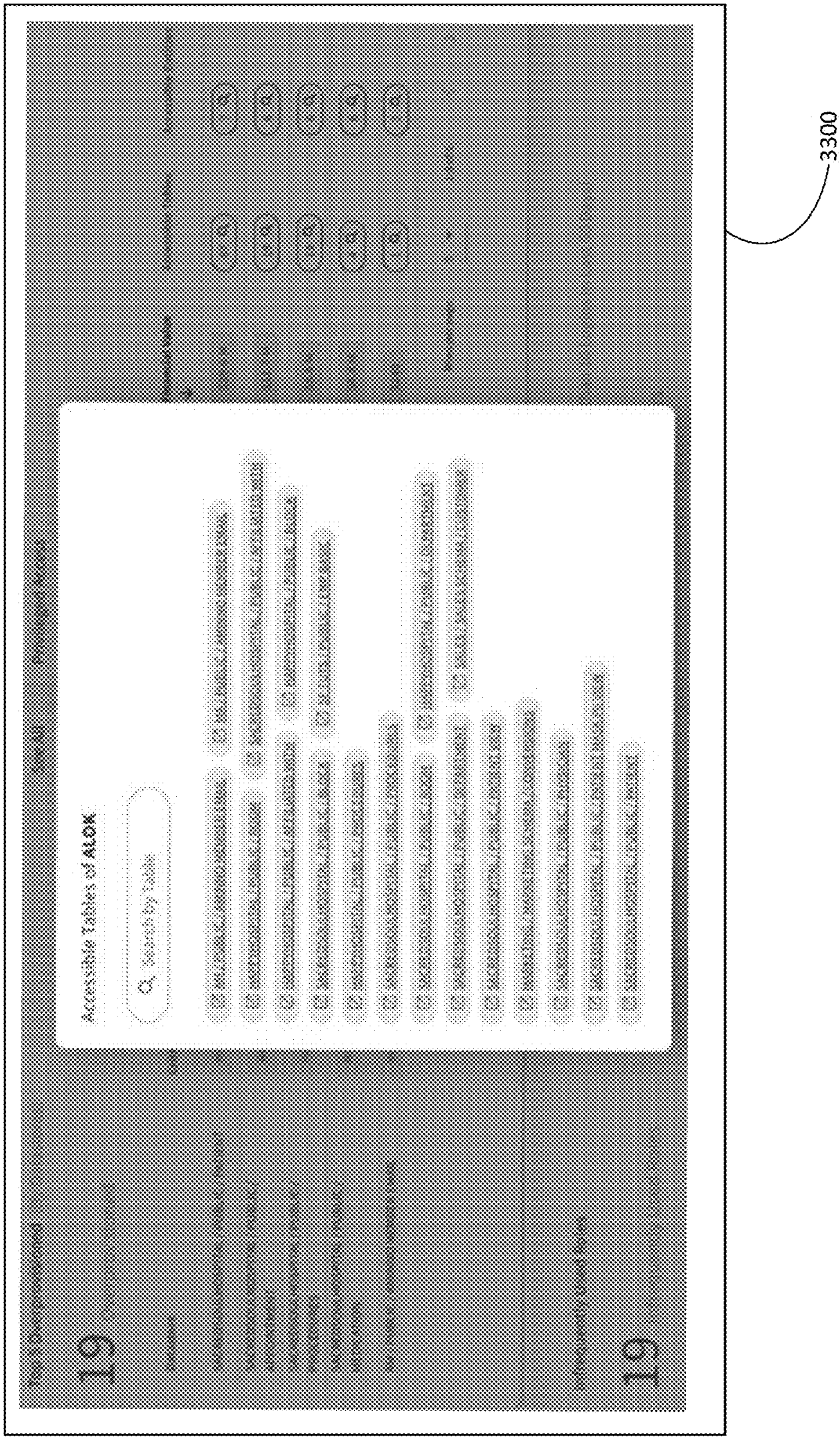
Figure 34:
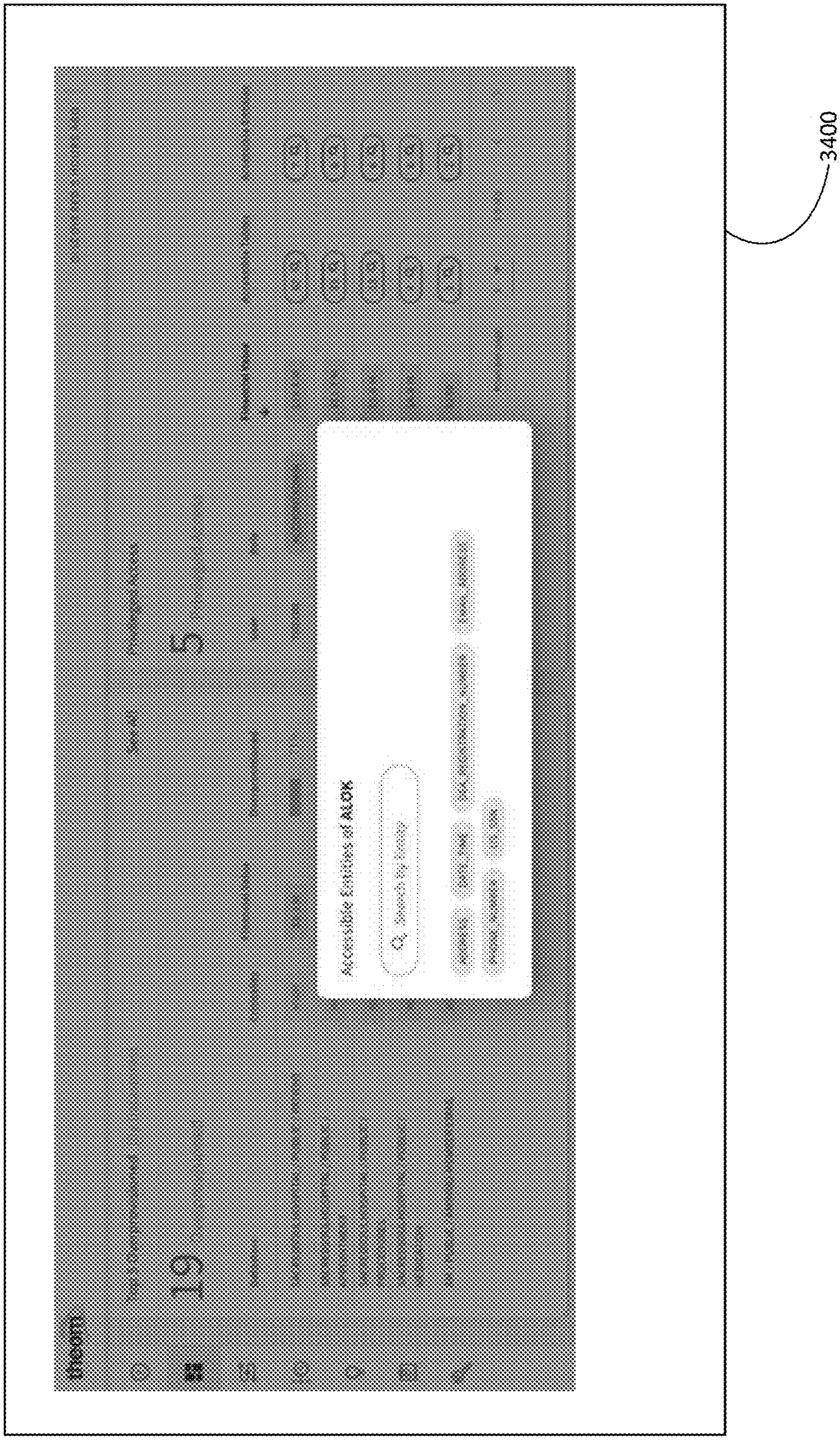

FIGS. 32-34 illustrates an example screenshot 3200-3400 showing privilege access, according to some embodiments.

Figure 35:
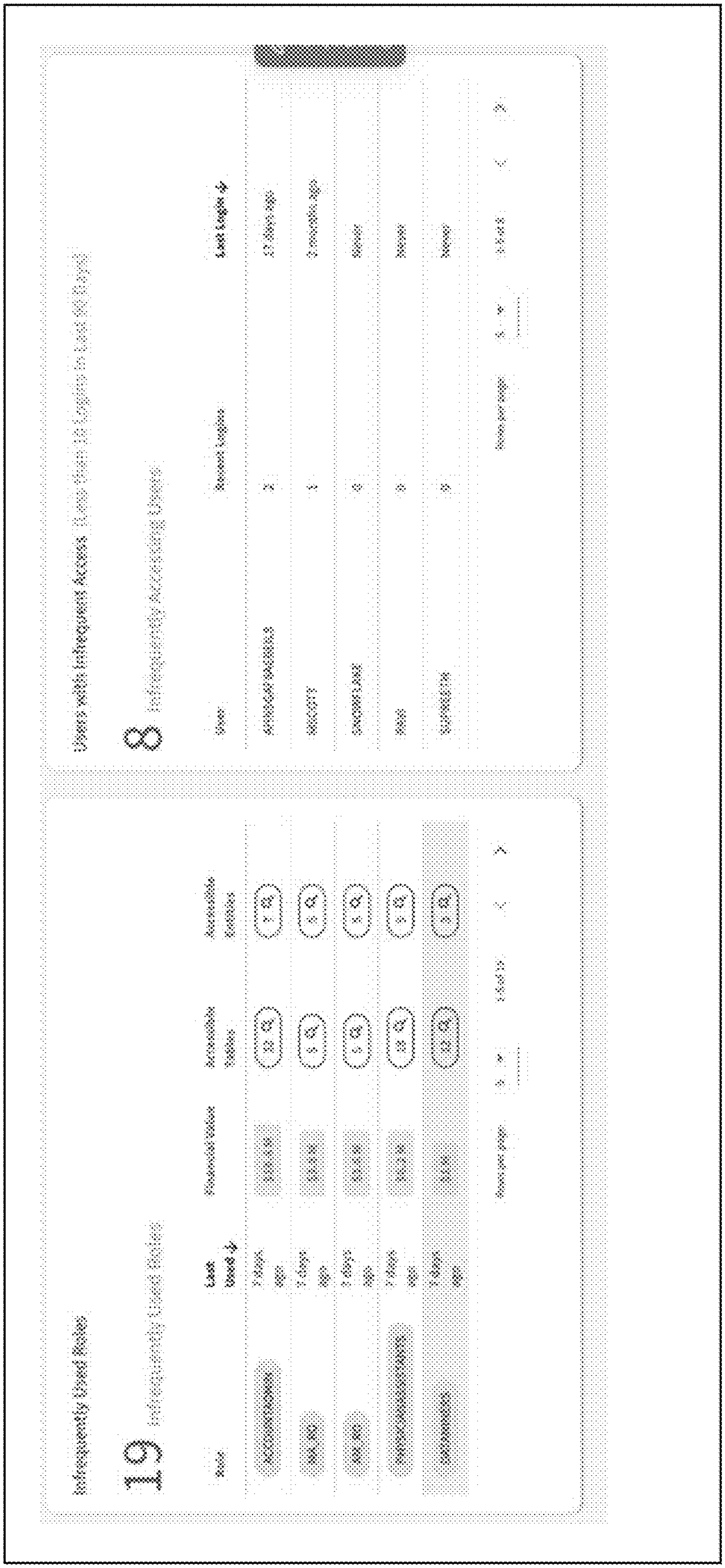
FIG. 35 illustrates an example screenshot showing users with infrequently used roles and users with infrequently access, according to some embodiments.

FIG. 35 illustrates an example screenshot 3500 showing user with infrequently used roles and users with infrequently access, according to some embodiments. Users with infrequently accessed roles doing excessive data dumps from sensitive data tables or roles which are used infrequently being accessed to enumerate or discover tables, integrations, functions or likes is a cause of concern from attack detection perspective.

Additional Computing Systems

Figure 36:
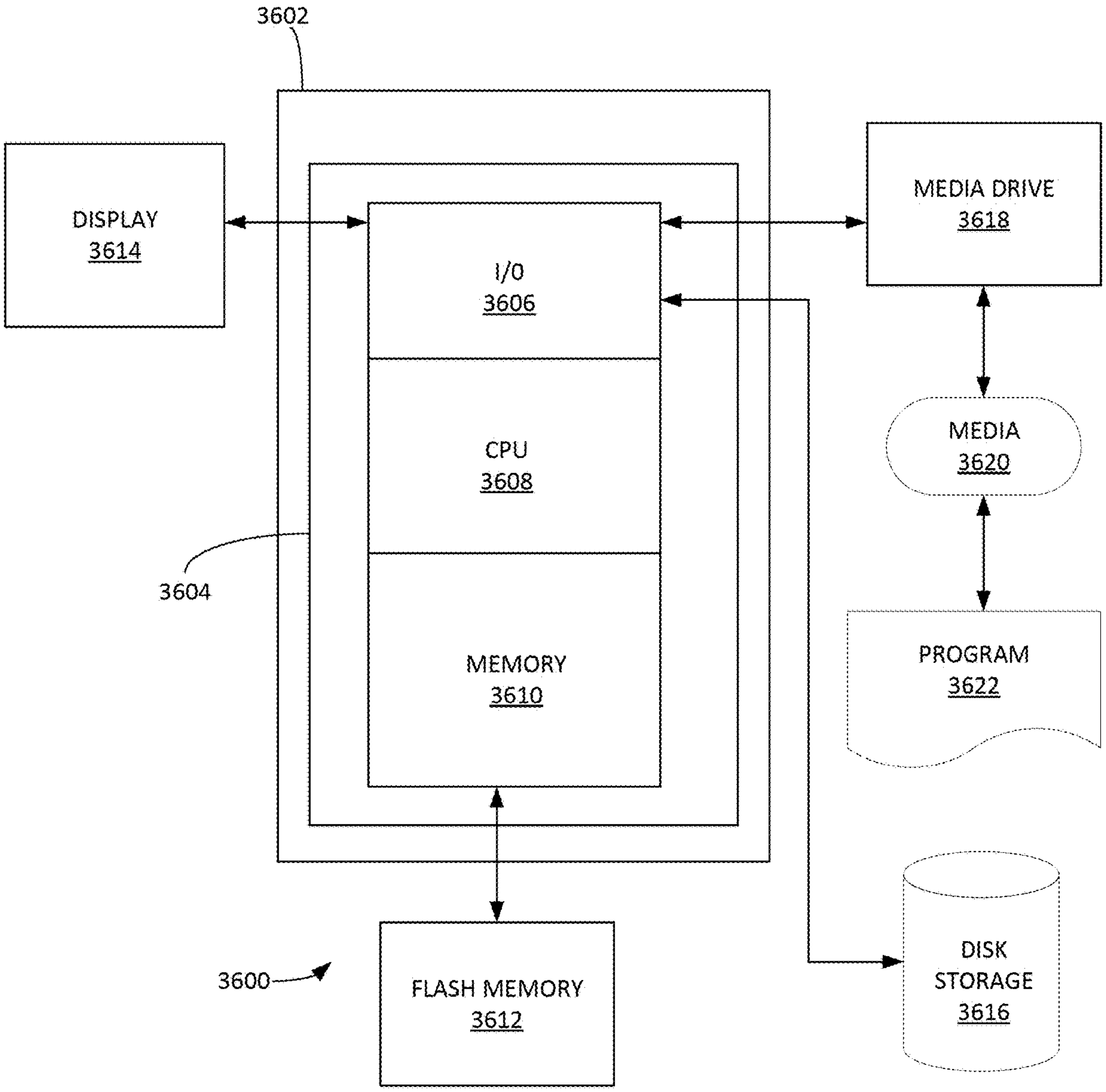
FIG. 36 depicts an exemplary computing system that can be configured to perform any one of the processes provided herein.

FIG. 36 depicts an exemplary computing system 3600 that can be configured to perform any one of the processes provided herein. In this context, computing system 3600 may include, for example, a processor, memory, storage, and I/O devices (e.g., monitor, keyboard, disk drive, Internet connection, etc.). However, computing system 3600 may include circuitry or other specialized hardware for carrying out some or all aspects of the processes. In some operational settings, computing system 3600 may be configured as a system that includes one or more units, each of which is configured to carry out some aspects of the processes either in software, hardware, or some combination thereof.

FIG. 36 depicts computing system 3600 with a number of components that may be used to perform any of the processes described herein. The main system 3602 includes a motherboard 3604 having an I/O section 3606, one or more central processing units (CPU) 3608, and a memory section 3610, which may have a flash memory card 3612 related to it. The I/O section 3606 can be connected to a display 3614, a keyboard and/or another user input (not shown), a disk storage unit 3616, and a media drive unit 3618. The media drive unit 3618 can read/write a computer-readable medium 3620, which can contain programs 3622 and/or databases. Computing system 3600 can include a web browser. Moreover, it is noted that computing system 3600 can be configured to include additional systems in order to fulfill various functionalities. Computing system 3600 can communicate with other computing devices based on various computer communication protocols such a Wi-Fi, Bluetooth® (and/or other standards for exchanging data over short distances includes those using short-wavelength radio transmissions), USB, Ethernet, cellular, an ultrasonic local area communication protocol, etc.

Additional Machine Learning Methods

Figure 37:
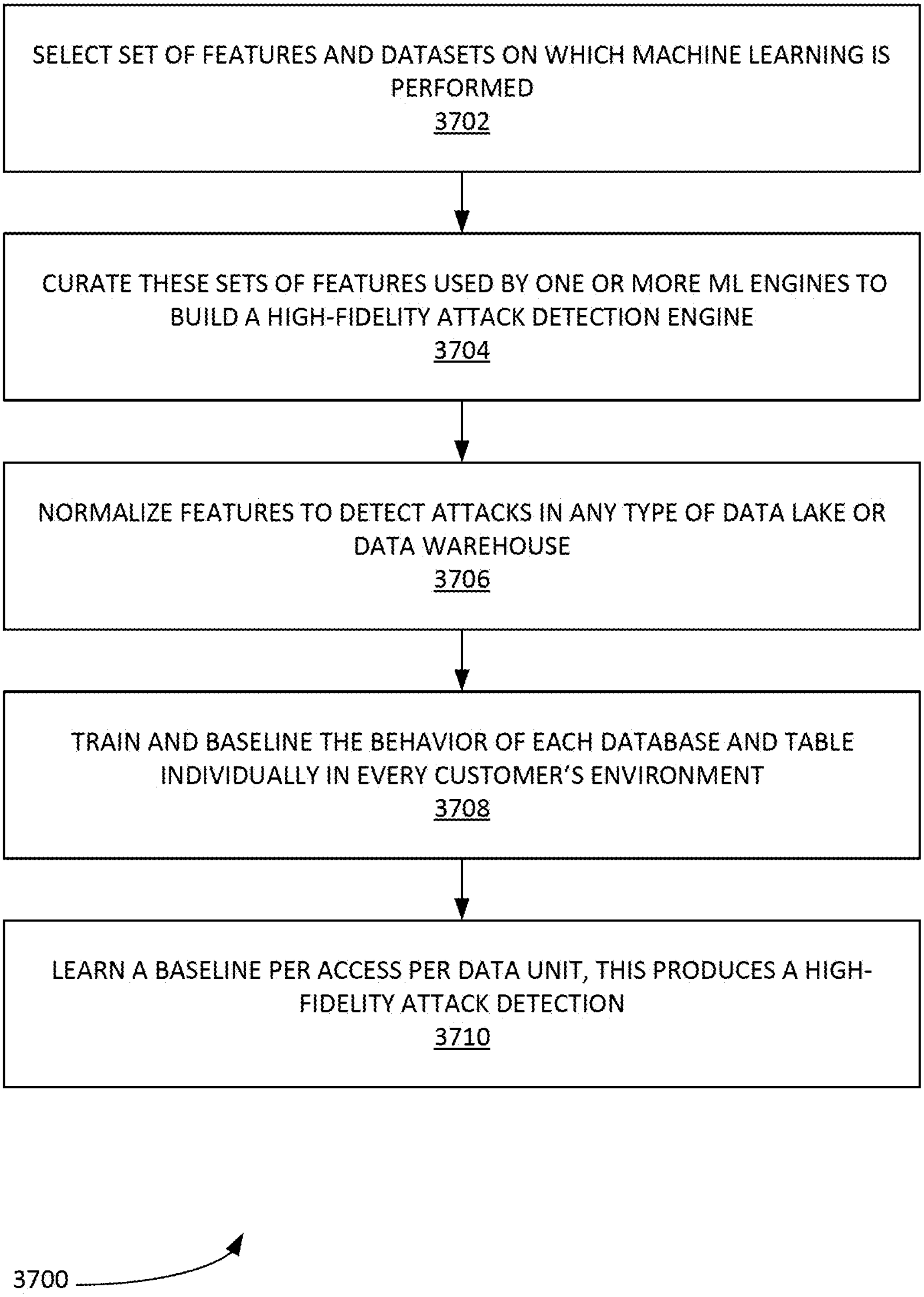
FIG. 37 illustrates an example process for implementing machine-learning processes, according to some embodiments.

FIG. 37 illustrates an example process 3700 for implementing machine-learning processes, according to some embodiments. Process 3700 can be integrated into the ML processes and methods discussed supra. In step 3702, process 3700 can select a set of features and datasets on which machine learning is performed. These can be normalized sets of features work across the wide variety of data warehouses and/or data lakes. In step 3704, process 3700 can curate these sets of features used by one or more ML engines to build a high-fidelity attack detection engine. These can be curated to provide absolutely low false positives and negatives at the lowest possible cost and storage.

In step 3706, process 3700 normalizes the features to detect attacks in any type of data lake or data warehouse. In step 3708, process 3700 trains and baselines the behavior of each database and table individually in every customer's environment. This ensures that models are personalized and tailored to each customer's environment, further the models are specific to the particular database of the customer. For example a test database of a customer may have a very different access baseline as compared to a CRM production database of the same customer. In step 3710, process 3700 learns a baseline per access (e.g. role and user) per data unit (database and table), this produces a high-fidelity attack detection.

The training period can include a lookback period (e.g. min ninety (90) days, six (6) months, etc.). Training versus predicting of the model is now discussed. Frist two/thirds of the lookback period can be used for training. The final third of the lookback period can be used for predicting. When a new data store or a new database is onboarded into the present invention, process 3700 may not have a baseline for the new datastore. Even though the customer may have been using process 3700 for other databases inside say Snowflake. So any predictions and detections process 3700 makes, may not have the fidelity customers may be used to. To address this scenario, process 3700 transparently learns a new baseline for every database, when it is onboarded. Always trigger training for that database. Process 3700, in one example, uses the last 90 days or longer of access and operational data for the datastore.

Learning Feedback can utilize reinforced learning methods. A false positive indication from the UI drives white-listing (e.g. data relabeling). Feedback can be given per event (e.g. that is a row per tile in the UI).

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine-accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed by this United States patent:

1. A computerized method for detecting reconnaissance and infiltration in data lakes and cloud warehouses, comprising:

monitoring a SaaS data store or a cloud-native data store from inside the data store;

examining an attack and automatically identifying how far the attack has progressed in an attack lifecycle;

identifying a target and scope of the attack to evaluate how far attackers have penetrated a monitored system and an identification of the target; and establishing a value of an asset subject to an attacker's attack and mapping an impact of the attack on a confidentiality, integrity and availability (CIA) triad.

2. The computerized method of claim 1, wherein the SaaS data store or the cloud-native data stores comprises a data lake warehouse.

3. The computerized method of claim 2, wherein the attacker comprises a malware-based attacker.

4. The computerized method of claim 3 further comprising:

using a machine learned model to detect the malware-based attacker attempting to abuse data.

5. The computerized method of claim 4 further comprising:

providing an automated protection action to counter the malware-based attacker attempting to abuse data.

6. The computerized method of claim 5 further comprising:

delivering a unified data protection system against all forms of data attacks.

7. The computerized method of claim 6, wherein the unified data protection system provides a solution that covers malicious or accidental insider attacks and advanced persistent threats to automated supply chain attacks where malware exploits vulnerabilities in trusted code and gains access to trusted systems fingerprint and identify the attackers.

8. The computerized method of claim 7 further comprising:

calculating an overall grade for a preventative security health, wherein the overall grade is calculated across the SaaS data store or the cloud-native data store.

9. A computerized method for implementing a SaaS data store and data lake house cybersecurity hygiene posture analysis, comprising:

automatically analyzing and checking an entity's SaaS data lakes and warehouses for a set of cybersecurity weaknesses that are exploitable by an attacker;

based on the analyzing and checking, determining a set of cybersecurity weakness in the entity's SaaS data lakes and warehouse;

ranking the cybersecurity weaknesses based on a data at risk value;

classifying a content of the data in the entity's SaaS data lakes and warehouses;

calculating a preventative cybersecurity grade for the entity's SaaS data lakes and warehouses;

automatically detecting any data stores in the entity's SaaS data lakes and warehouses that have data stored that have been copied from another primary data repository and have a different security posture;

automatically detecting any data stores in the entity's SaaS data lakes and warehouses that have data stored that have not been accessed in a specified period; and tracking and classifying a cyberattack and placings the cyberattack in one of n-number stages.

10. The computerized method of claim 9, wherein the classifying of the content of the data comprises:

using a plurality of natural language processing engines to identify a set of entity types present in each unit of data.

11. The computerized method of claim 10, wherein calculating the preventative cybersecurity grade is based on an equation comprising:

$$x = 1 - \big[\big(100 * (CHRh/CH + CHRM/CH + CHRL/CH) + 10 * (CMRh/CM + CMRM/CM + CMRL/CM) + (CLRH/CL + CLRM/CL + CLRL/CL)\big) / 111\big].$$

12. The computerized method of claim 11, wherein a C is either a Cardinality of Entities associated with a Category of High|Medium|Low or a Sum of a financial value based amount for Entities in a High|Medium|Low value.

13. The computerized method of claim 12, wherein the n-number stages correspond to a MITRE provided kill chain.

14. The computerized method of claim 13 further comprising:

automatically applying a principle of least privilege to one or more surface reduction methods.

15. The computerized method of claim 14 further comprising:

identifying one or more over-provisioned users and machines with the entity's SaaS data lakes and warehouses.

* * * * *